(12) United States Patent
Agarwal et al.

(10) Patent No.: US 7,739,245 B1
(45) Date of Patent: Jun. 15, 2010

(54) BLOCK LOCKING IN A MULTI-NODE ENVIRONMENT

(75) Inventors: Anurag Agarwal, Sunnyvale, CA (US); Harold B. Prince, Jr., Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 625 days.

(21) Appl. No.: 10/260,805

(22) Filed: Sep. 30, 2002

(51) Int. Cl.
*G06F 17/30* (2006.01)

(52) U.S. Cl. .................. 707/687; 707/704

(58) Field of Classification Search ............. 707/8–9, 707/10, 1, 687, 704; 709/203, 229
See application file for complete search history.

(56) References Cited

U.S. PATENT DOCUMENTS

| | | | | |
|---|---|---|---|---|
| 4,965,719 | A | 10/1990 | Shoens et al. | 711/100 |
| 6,185,601 | B1 * | 2/2001 | Wolff | 709/203 |
| 6,272,491 | B1 * | 8/2001 | Chan et al. | 707/8 |
| 6,405,274 | B1 | 6/2002 | Chan | 710/200 |
| 6,529,906 | B1 * | 3/2003 | Chan | 707/8 |
| 6,668,295 | B1 | 12/2003 | Chan | 710/200 |
| 6,697,901 | B1 * | 2/2004 | Shun Chan | 710/200 |
| 6,704,767 | B1 * | 3/2004 | Simmons et al. | 718/104 |
| 6,708,198 | B1 * | 3/2004 | Simmons et al. | 718/104 |
| 6,715,146 | B1 * | 3/2004 | Simmons et al. | 718/104 |
| 6,751,616 | B1 * | 6/2004 | Chan | 707/8 |
| 6,826,570 | B1 * | 11/2004 | Eshel et al. | 707/8 |
| 6,920,454 | B1 * | 7/2005 | Chan | 707/8 |
| 6,965,893 | B1 * | 11/2005 | Chan et al. | 707/8 |
| 2001/0032281 | A1 * | 10/2001 | Daynes | 710/200 |

* cited by examiner

*Primary Examiner*—Don Wong
*Assistant Examiner*—Sheree N Brown
(74) *Attorney, Agent, or Firm*—Campbell Stephenson LLP

(57) ABSTRACT

A method, system, application programming interface, computer system and computer program product to provide locks for controlling access to data by nodes in a multi-node system while minimizing the number of messages sent between nodes. Locks can be grouped into blocks of locks, and exclusive access to data protected by locks in a block of locks can be granted together to a block agent for a particular node. The block agent handles requests for access to the data on behalf of clients running on the respective node. The block agent sends a message to a block master running on another node only when a request is made for access to data to which the block agent has not already obtained access. Access can be granted to a block agent for an entire block or for a portion of a block of locks.

19 Claims, 15 Drawing Sheets

*Initialize First Lock In Block*

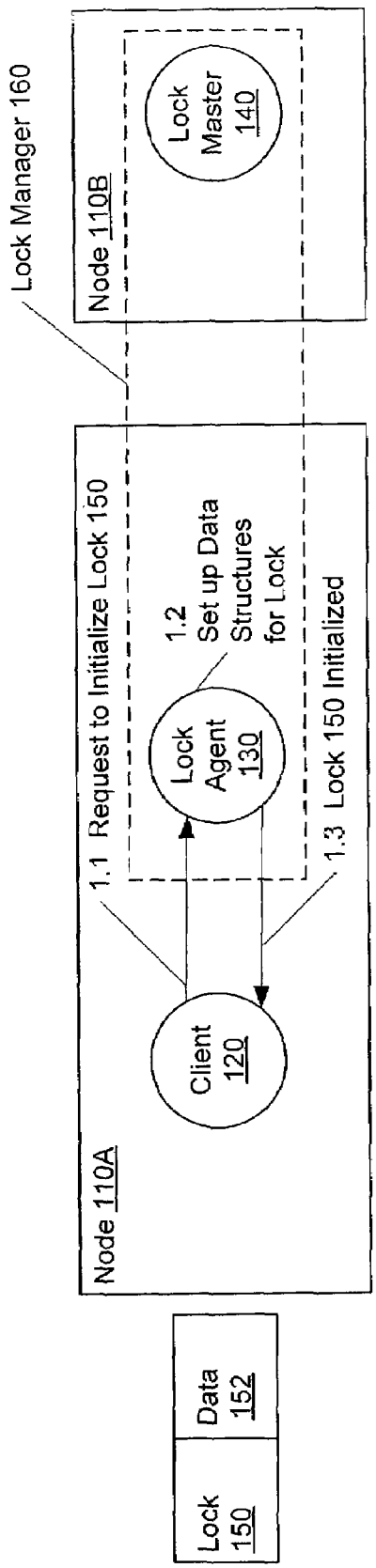
FIG. 1 Initialize Lock (Prior Art)
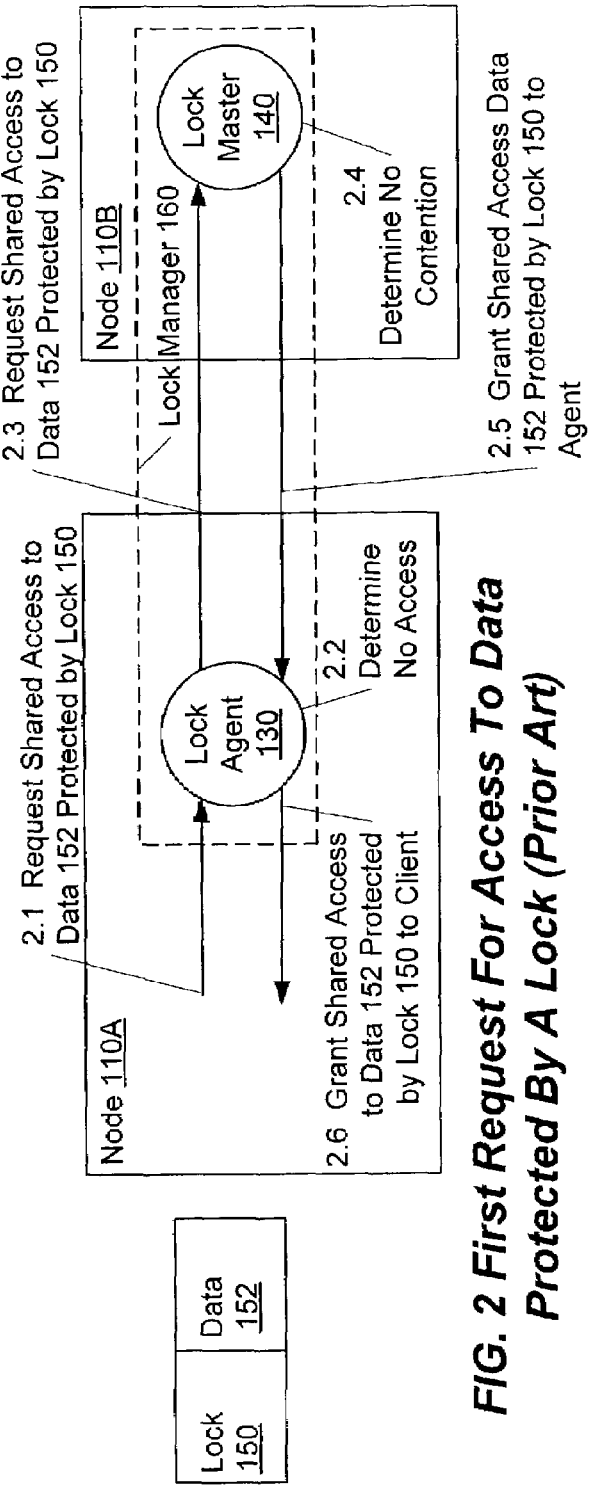
FIG. 2 First Request For Access To Data Protected By A Lock (Prior Art)

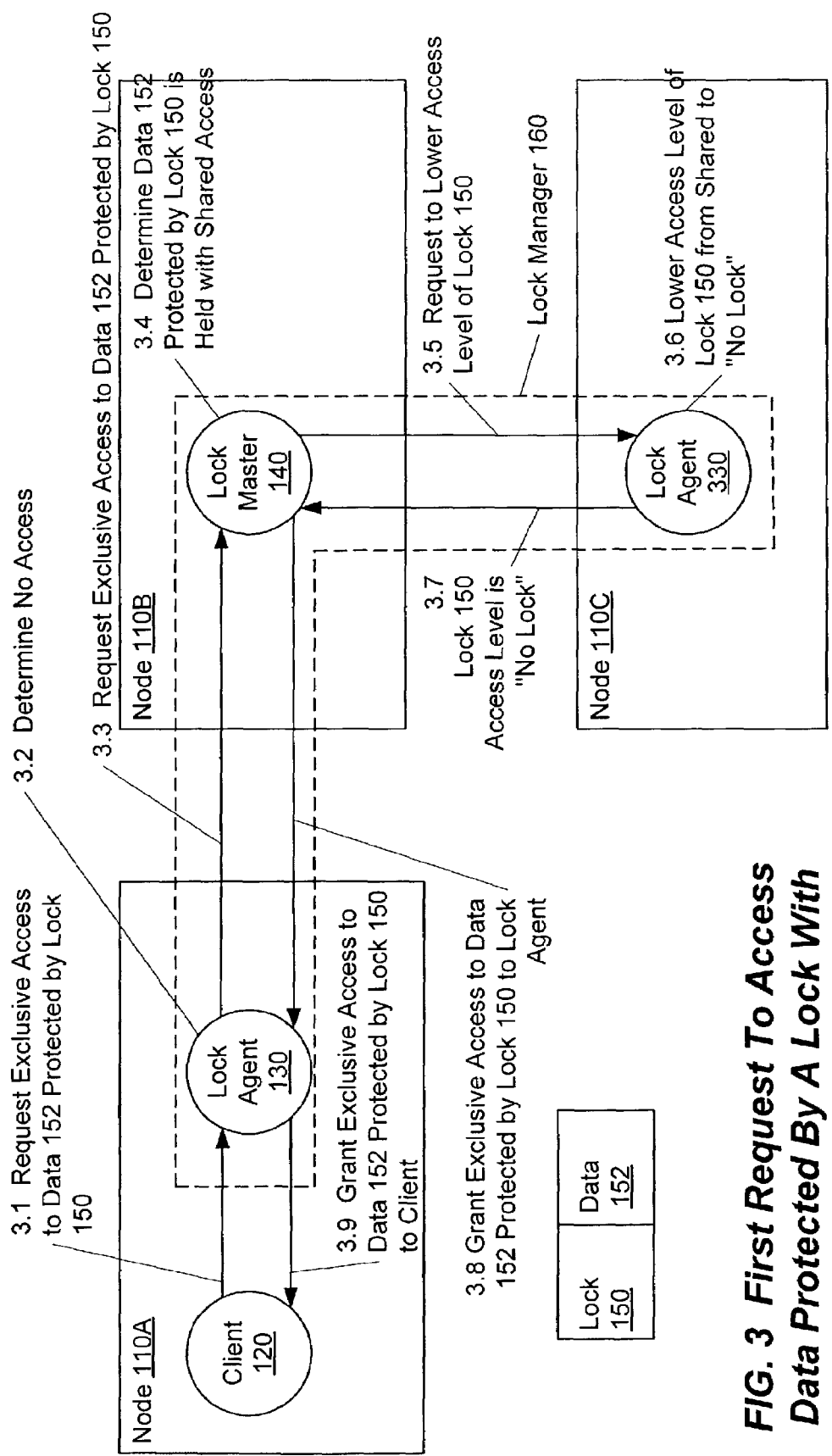
FIG. 3 *First Request To Access Data Protected By A Lock With Contention (Prior Art)*

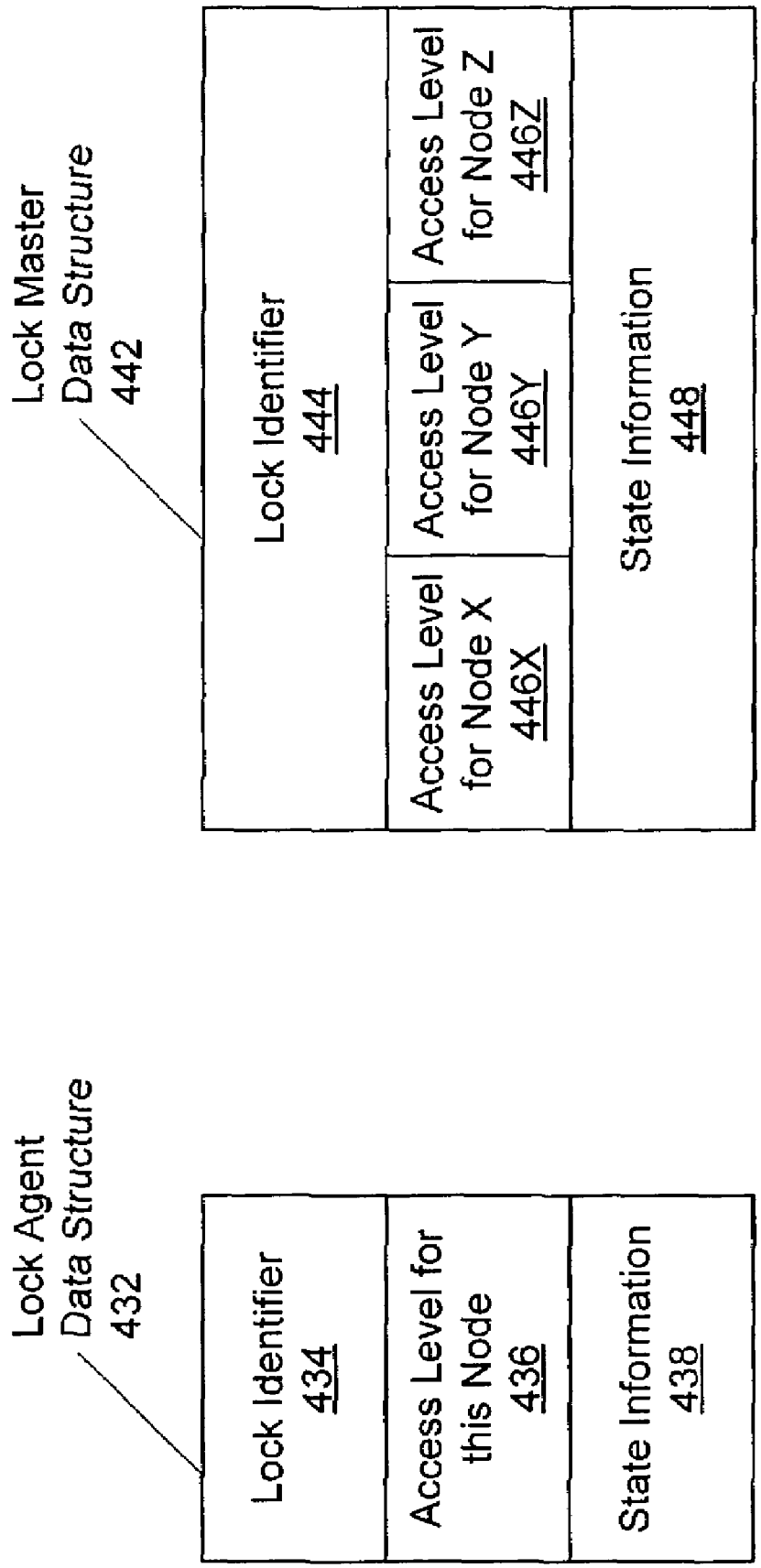
FIG. 4 Data Structures For Locks (Prior Art)

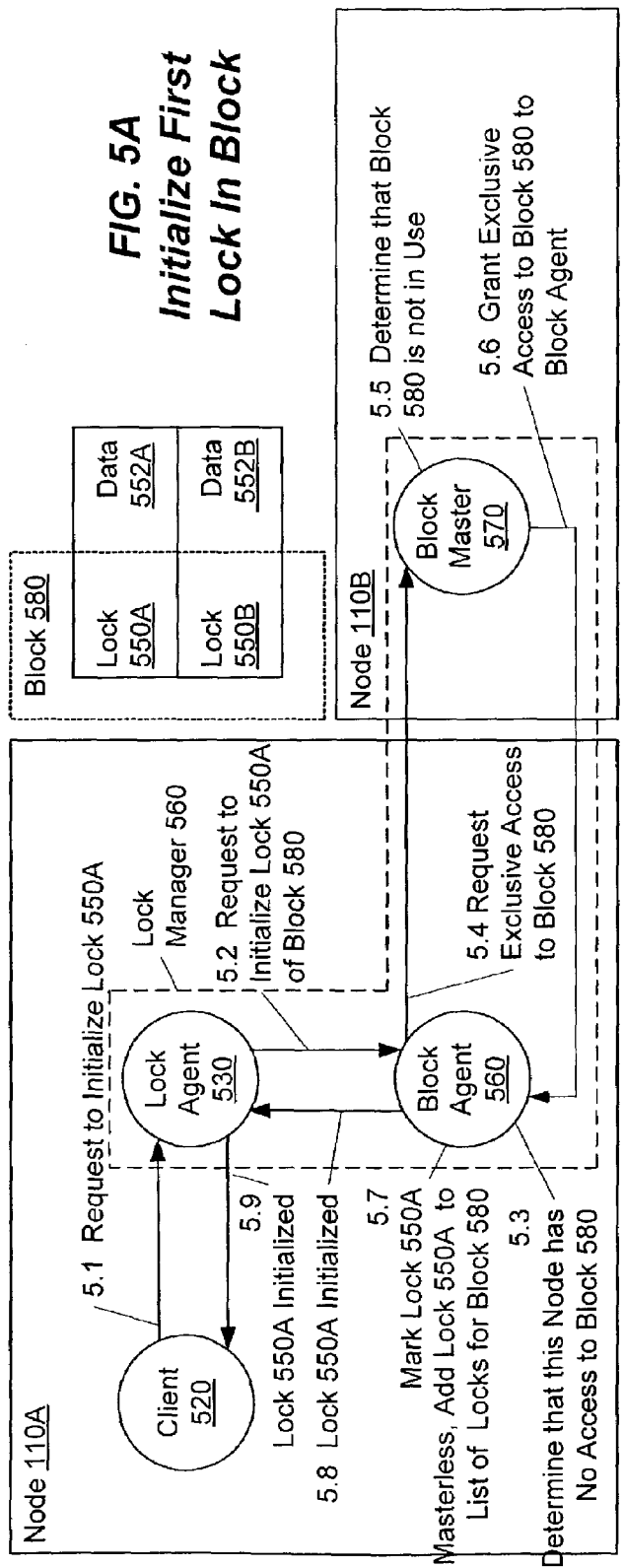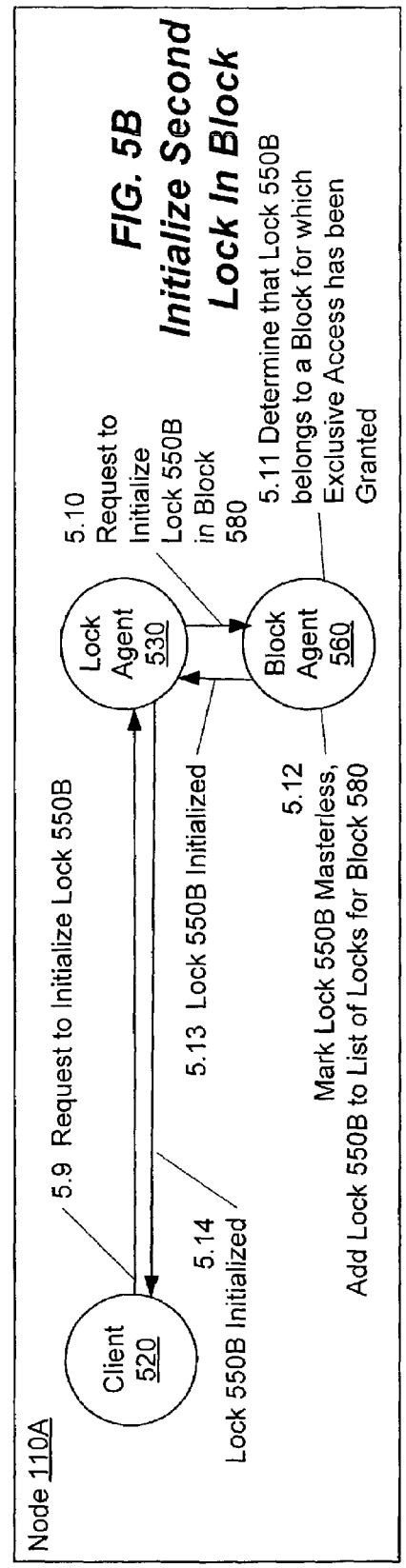

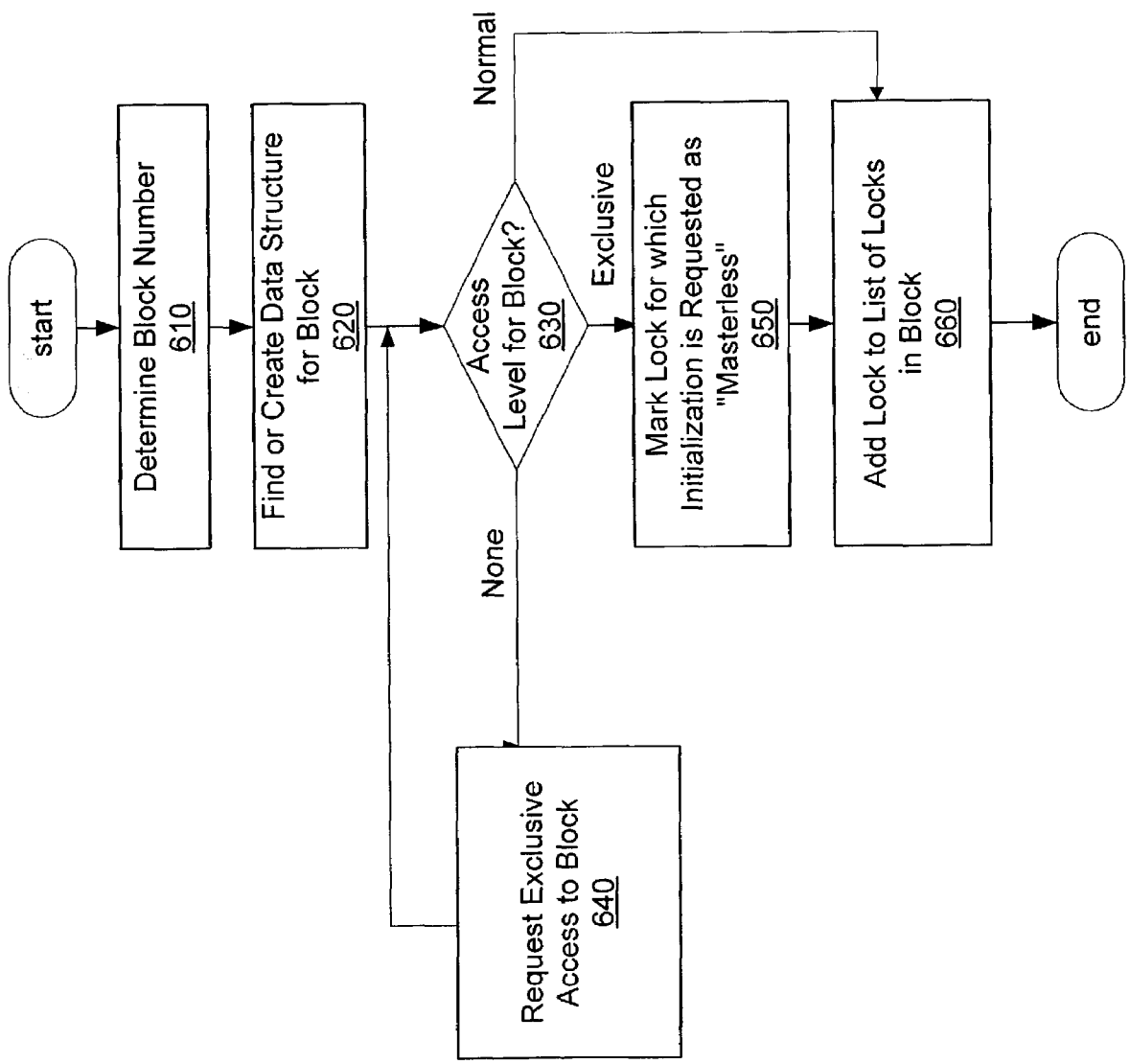

*Data Structures For Locks Grouped Into Blocks*

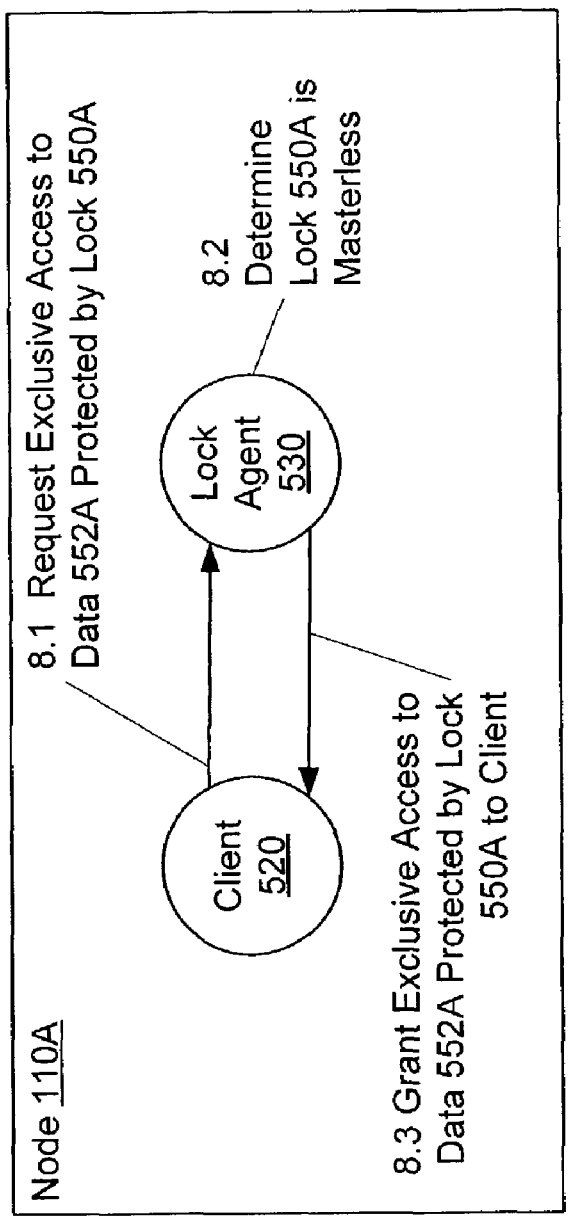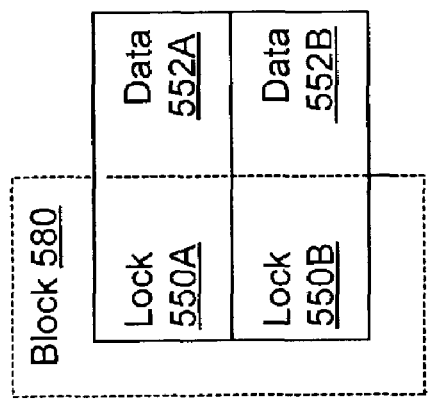
FIG. 8
First Request To Access Data
Protected By Masterless Lock Receive Request To Lower Access Level For A Block Data Structures For Sub-Blocks Of Blocks Of Locks FIG. 12 Request And Grant Messages For Blocks And Sub-Blocks FIG.13 Messages Between Block Agent And Block Master For Sub-Blocks

BLOCK LOCKING IN A MULTI-NODE ENVIRONMENT

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. A hardware or software failure affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from hardware and software failures.

Most complex business applications are run not on a single computer system, but in a distributed system in which multiple computer systems, referred to as nodes, each contribute processing resources and perform different tasks. In such an environment, disruption due to hardware and software failures can be lessened or prevented using a strategy known as clustering. In a clustered environment, computer systems and storage devices are interconnected, typically at high speeds within a local data center, for the purpose of improving reliability, availability, serviceability, and/or performance via load balancing. Redundant interconnections between the computer systems are typically included as well, and the collection of computer systems, storage devices, and redundant interconnections is referred to herein as a cluster. In some implementations, the cluster appears to users as a single highly available system. Different types of clusters may be established to perform independent tasks, to manage diverse hardware architectures performing similar tasks, or when local and backup computer systems are far apart physically.

In some clustering environments, only one of the computer systems in the cluster provides processing resources with respect to a particular software application. In other clustering environments, processing for a single software application is distributed among nodes in the cluster to balance the processing load.

Within a single computer system, multiple threads executing a given software application may access and/or update the same data. The term 'thread' is used to describe the context in which a computer program is being executed. This context includes the program code, the data for execution of the program code, a stack, a program counter indicating a memory location from which the next instruction will come, and state information. Coordination is necessary to ensure that one thread does not read shared data at the same time that another thread is updating that data, thereby possibly resulting in data inconsistency depending upon the timing of the two operations. In clustering environments where processing for a given software application is "load balanced," threads that share data can be running on different nodes within a cluster.

Coordination between threads accessing shared data is often implemented using locks. Typically, a lock is software that protects a piece of shared data; for example, in a file system, a lock can protect a file or a disk block. In a distributed system, a lock can also protect shared "state" information distributed in memories of each node in the system, such as the online or offline status of a given software application. All shared data is protected by a lock, and locks are typically managed by a lock manager, which often provides an interface to be used by other application programs.

A lock is requested before the calling application program can access data protected by the lock. A calling application program can typically request an "exclusive" lock to write or update data protected by the lock or a "shared" lock to read data protected by the lock. If the calling application program is granted an exclusive lock, then the lock manager guarantees that the calling program is the only thread holding the lock. If the calling program is granted a shared lock, then other threads may also be holding shared locks on the data, but no other thread can hold an exclusive lock on that data.

The lock manager cannot always grant a lock request right away. Consider an example where one thread has an exclusive lock L on a given set of data, and a second thread requests shared access to the given set of data. The second thread's request cannot be granted until the first thread has released the exclusive lock on the given set of data.

A lock can be placed on data that are stored on a shared disk. Locks can also be placed on shared data stored in memory for each node, where the data must be consistent for all nodes in a cluster. For example, nodes in a cluster can share information indicating that a file system is mounted. A lock can be placed on the shared state information when the state of the file system changes from mounted to not mounted, or vice versa.

FIGS. 1 through 4 provide examples of prior art messaging used to implement locks for data sharing. FIG. 1 is a block diagram illustrating prior art initialization of a lock. Two nodes, node 110A and node 110B, share data 152 protected by a lock 150. Lock 150 is managed by lock manager 160, which includes a module on each of nodes 110A and 110B, respectively, lock agent 130 and lock master 140. In many environments, a single lock master exists for each lock, and the lock master resides on one of the nodes. In the example shown, lock master 140 resides on node 110B. Lock master 140 tracks the access levels for a given lock in use on all nodes. Lock master 140 also maintains a queue of unsatisfied locking requests, which lock master 140 grants as threads unlock the corresponding lock. Different locks may have lock masters on different nodes, and all nodes agree on which node masters a given lock.

Each node can have a program that handles access to data protected by each lock. In this example, lock agent 130, a module of lock manager 160, runs on node 110A to provide access to data 152 protected by lock 150. Node 110B may also include another lock agent (not shown) to handle locks for clients on node 110B. If lock agent 130 itself does not have the access level requested by a client, such as client 120, running on node 110A, lock agent 130 calls lock master 140 to request the desired access level for node 110A. Lock master 140 keeps track of the access levels, also referred to as lock levels, held by all of the lock agents, such as lock agent 130, on each node.

Initialization of a lock, such as lock 150, is initiated by a client, or thread, such as client 120 of node 110A. A client calls a lock agent, such as lock agent 130, for the lock protecting the data of interest, such as lock 150. In the embodiment shown in FIG. 1, initialization is performed before the client is ready to use the data and allows a lock agent to prepare for that client's use of the lock. For example, the lock agent may allocate data structures or perform other functions to prepare for the client's use of the lock.

In action 1.1, client 120 running on node 110A requests lock agent 130 to initialize lock 150 on data 152. In action 1.2, lock agent 130 sets up data structures necessary for client 120 to use data 152 protected by lock 150. No communication with lock master 140 is needed to set up the data structures, which are discussed further below with reference to FIG. 3. In action 1.3, lock agent 130 informs client 120 that lock 150 is initialized.

Subsequent requests to initialize locks from client 120 or other clients (not shown) on node 110A can be granted by lock agent 130 by performing actions such as actions 1.1, 1.2, and 1.3. In other embodiments, initializing a lock may include communication with a lock master, such as lock master 140.

FIG. 2 is a block diagram illustrating a prior art first request for access to data protected by a lock that has been initialized and grant of the first request in the environment of FIG. 1. In action 2.1, client 120 requests shared access to data 152 protected by lock 150, which was initialized as described with reference to FIG. 1 above. In action 2.2, lock agent 130 determines that access to lock 150 has not yet been granted to lock agent 130. In action 2.3, lock agent 130 requests shared access to data 152 protected by lock 150 from lock master 140 running on node 110B. Lock master 140 determines in action 2.4 that no other client is currently holding lock 150, and therefore that no contention exists for data 152 protected by lock 150. Contention indicates that other nodes already hold conflicting access levels for this lock. For example, if a node holds shared access to a lock, then no node can be granted exclusive access to data protected by the lock until the shared access is relinquished.

In action 2.5, lock master 140 grants shared access to data 152 protected by lock 150 to lock agent 130. Now that lock agent 130 has been granted shared access to data 152, lock agent can grant shared access to any client running on node 110A that wishes to read data 152. A grant of access to a lock agent, such as lock agent 130, can be viewed as a grant of access to data protected by the lock, here lock 150, corresponding to the lock agent, for the entire node on which the lock agent is running. Lock agent 130 handles requests for access by client processes running on its respective node, in this case, node 110A. In action 2.6, lock agent 130 grants shared access to data 152 protected by lock 150 to client 120.

As shown in FIG. 2, each time lock agent 130 does not have the level of access requested by a client, such as client 120, lock agent 130 sends a message to lock master 140. When a lock agent must communicate with a lock master in order to obtain access to data protected by a lock on behalf of a client, locking is referred to herein as being performed in accordance with a "normal" lock protocol, and the lock itself is referred to as a "normal" lock.

Messaging between nodes is very expensive when compared to normal instruction execution; for example, on a typical computer system, a program can execute 250,000 instructions in the time it takes to send, receive, and process a message. Communicating with other processes on the same node is much less expensive, and therefore it is desirable, when possible, to minimize messages between nodes in favor of communications between processes on the same node. Using lock agents, such as lock agent 130, helps to minimize messaging because the lock agent can grant the access level that the lock agent itself has been granted. However, when the lock agent has not been granted access, the lock agent/lock master scheme still requires significant messaging whenever the lock agent has not already been granted the access level desired and the lock master is running on a different node.

FIG. 3 is a block diagram illustrating a prior art first request for access to data protected by a lock with contention between nodes and a grant of the first request. FIG. 3 is shown in the environment of FIGS. 1 and 2. In action 3.1, client 120 requests exclusive access to data 152 protected by lock 150. In action 3.2, lock agent 130 determines that exclusive access to data 152 protected by lock 150 has not yet been granted to lock agent 130. In action 3.3, lock agent 130 requests exclusive access to data 152 protected by lock 150 from lock master 140 running on node 110B, in accordance with the normal lock protocol.

Lock master 140 determines in action 3.4 that data protected by lock 150 are currently held at a shared access level by lock agent 330 running on node 110C, in contrast to the finding in FIG. 2 that no contention was present. Because the data protected by lock 150 is currently held at a shared access level, exclusive access cannot be granted to lock agent 130. Lock master 140 has three options at this point: (1) wait until the client of lock agent 130 holding lock 150 releases lock 150; (2) grant shared access rather than exclusive access to lock agent 130; or (3) request lock agent 330 to release lock 150.

In this example, lock master 140 takes the third option, and in action 3.5, lock master 140 requests lock agent 330 to lower the access level with which lock agent 330 holds data 152 protected by lock 150. Lowering the access level with which a lock agent holds data protected by a lock is also referred to herein as "lowering the access level for the lock," and locks can be referred to as having an access level. Lowering the access level is also referred to herein as "releasing the access level" or releasing the lock. A request to lower the access level can also be referred to as a revocation request.

In response to the revocation request to lower the lock access level for lock 150, in action 3.6, lock agen 330 waits on clients on node 110C to finish using data 152 so that it can lower the access level of lock 150. In action 3.7, lock agent 330 sends a message indicating that the access level of lock 150 is lowered to a "no lock" access level. Lock master 140 records the fact that lock agent 330 no longer holds lock 150 in a data structure, which is described with reference to FIG. 4 below. No contention exists, which allows exclusive access to be available to lock agent 130.

In action 3.8, lock master 140 grants exclusive access to data 152 protected by lock 150 to lock agent 130. Now that lock agent 130 has exclusive access to data 152, lock agent can grant exclusive access to data 152 protected by lock 150 to client 120.

In this example, an additional message was sent by lock master 140 in action 3.5 between nodes to handle contention for data 152 between nodes 110A and 110B. The other two options described above, waiting until the client of the lock agent holding the lock has released the lock, and granting shared access rather than exclusive access, do not require lock master 140 to send additional messages to lock agent 330. Waiting until lock 150 is released would eliminate action 3.5, where lock master 140 requests lock agent 330 to revoke access to data 152 protected by lock 150. However, access to data 152 by client 120 would be delayed until lock agent 330 voluntarily releases lock 150 on data 152. Granting shared access instead of exclusive access would change actions 3.8 and 3.9 to grant shared rather than exclusive access, and would eliminate action 3.5. However, a grant of shared rather than exclusive access would not satisfy the need of client 120, possibly resulting in additional messaging for client 120 to obtain the access level needed.

FIG. 4 is an example of prior art data structures maintained by the lock agent and lock master of FIGS. 1 through 3. Lock agent 130 of FIG. 1 (not shown) maintains lock agent data structure 432 to track access levels granted to the node on which lock agent 130 resides, node 110A of FIG. 1 (not shown). For each lock, lock agent data structure 432 includes lock identifier 434, the current access level for this node 436, and state information 438. State information 438 enables lock agent 130 to manage multiple requests for the lock identified by lock identifier 434.

Lock master 140 of FIG. 1 (not shown) maintains lock master data structure 442 to track access levels granted to each node. In some embodiments, lock master 140 may track each lock request from each thread on every node, and the data structure in such an embodiment would track lock- and thread-level information. In this example, lock master data structure 442 includes lock identifier 444, access level for node X 446X, access level for node Y 446Y, and access level for node Z 446Z, and state information 448.

As illustrated in this example, communication to request and grant locks in a multi-node environment has heretofore been very expensive and significantly reduces time available for processing instructions. What is needed is a system that minimizes messaging between nodes, while allowing locks to be used to enable data sharing among multiple threads running on the nodes.

SUMMARY OF THE INVENTION

A method, system, application programming interface, computer system and computer program product to provide locks for controlling access to data by nodes in a multi-node system while minimizing the number of messages sent between nodes. Locks can be grouped into blocks of locks, and exclusive access to data protected by locks in a block of locks can be granted together to a block agent for a particular node. The block agent handles requests for access to the data made on behalf of clients running on the respective node. The block agent sends a message to a block master running on another node only when a request is made for access to data for which the block agent has not already obtained access. Access can be granted to a block agent for an entire block or for a portion of a block of locks.

BRIEF DESCRIPTION OF THE DRAWINGS

The present invention may be better understood, and its numerous objects, features, and advantages made apparent to those skilled in the art by referencing the accompanying drawings.

FIG. 1 is a block diagram illustrating prior art initialization of a lock, as described above.

FIG. 2 is a block diagram illustrating a prior art first request for access to data protected by a lock and grant of the first request in the environment of FIG. 1, as described above.

FIG. 3 is a block diagram illustrating a prior art first request for access to data protected by a lock with contention between nodes, and a grant of the first request, as described above.

FIG. 4 is an example of prior art data structures maintained by the lock agent and lock master of FIGS. 1 through 3, as described above.

FIG. 5A is a block diagram illustrating initialization of a first lock in a block by a lock manager in accordance with the present invention.

FIG. 5B is a block diagram illustrating initialization of a second lock in the block of FIG. 5A.

FIG. 6 is a flowchart of the actions taken by the block agent when a request to initialize a lock is received.

FIG. 8 is a block diagram illustrating a first request to access data protected by a masterless lock, and a grant of access to the data.

The use of the same reference symbols in different drawings indicates similar or identical items.

DETAILED DESCRIPTION

Figure 7:
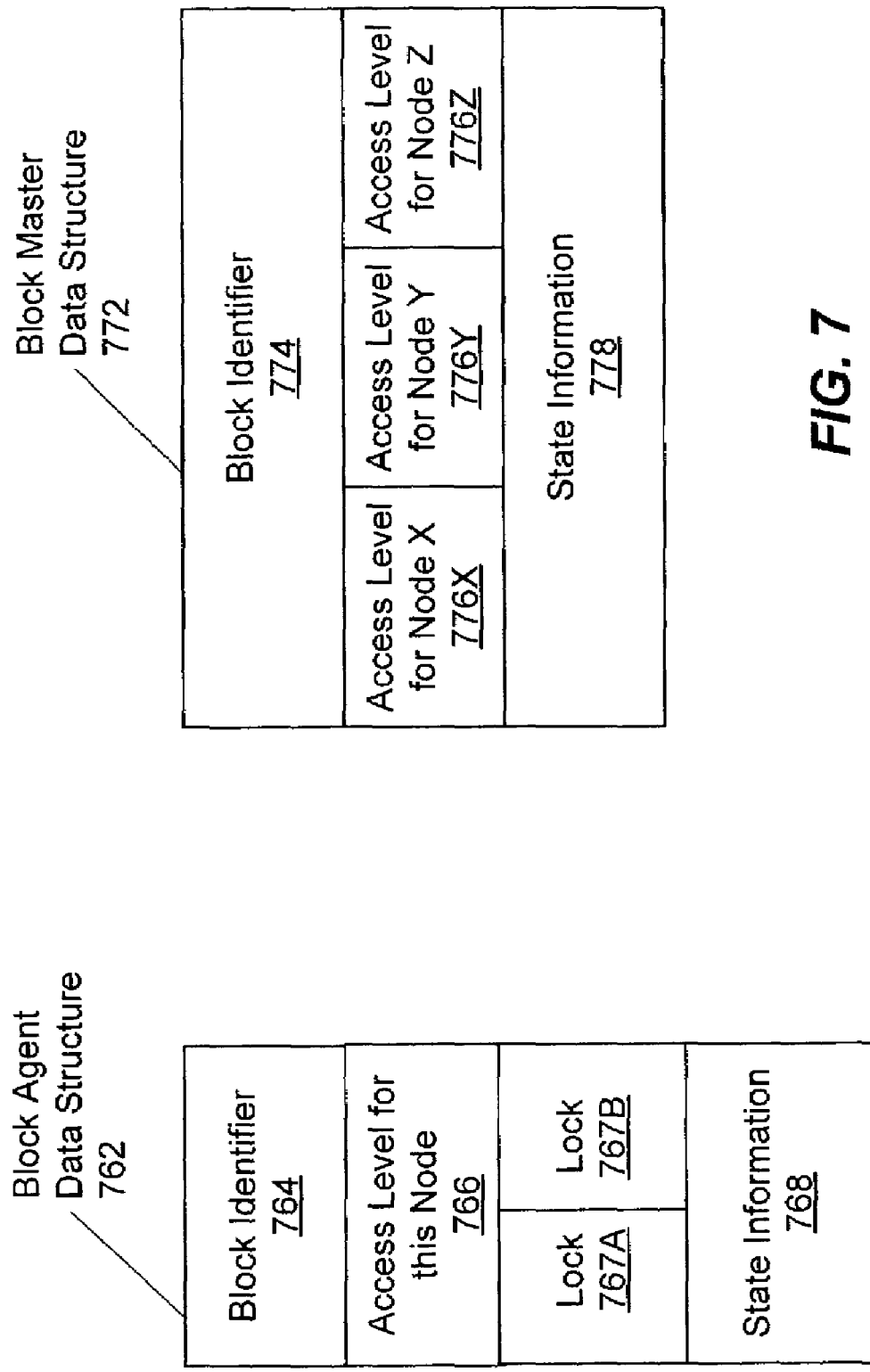
FIG. 7 is an example of data structures maintained by the block agent and block master.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

INTRODUCTION

The present invention provides locks for controlling access to data by nodes in a multi-node system while minimizing the number of messages sent between nodes. Locks can be grouped into blocks of locks, and exclusive access to data protected by locks in a block of locks can be granted together to a block agent for a particular node. The block agent handles requests for access to the data made on behalf of clients running on the respective node. The block agent sends a message to a block master running on another node only when a request is made agent for access to data to which the block agent has not already obtained access. Access can be granted to a block agent for an entire block or for a portion of a block of locks.

The present invention is described herein within the context of a clustering environment, although one of ordinary skill in the art will recognize that the invention equally applies to other multi-node environments and is not intended to be limited to use in a clustering environment.

Pieces of data, such as files in a single directory, are often accessed together, rather than randomly. For example, an application running in a clustering file system may scan all files in a given directory. Each file may have one or more locks that must be granted to access data in the file. To take advantage of this non-random access pattern, the present invention enables an application to group locks on data that are likely to be accessed together into blocks. Grouping the locks into blocks enables a node to make a single request for access to data protected by a given lock and automatically receive access to data protected by some or all of the entire group of locks in the block.

FIG. 5A is a block diagram illustrating initialization of a first lock in a block lock manager in accordance with the present invention. Lock manager 560 includes lock agent 530, a corresponding lock master (not shown), block agent 560 on node 110A, and block master 570 on node 110B. Block 580 groups locks 550A on data 552A and lock 550B on data 552B. As described above, a client, such as client 520, requests access to data protected by locks from a lock agent, such as lock agent 530. As a result, the present invention does not require changes to client applications that access data protected by locks unless the client application incorporates the use of block locking.

Lock agent 530 communicates with block agent 560 to obtain access to data protected by a lock in a block of locks, such as block 580. Block agent 560 receives the request for access to data protected by the requested lock in block 580 from the requesting lock agent, in this case, lock agent 530. Each block has a corresponding block master, which is block master 570 for block 580.

In one embodiment, a given node can be granted an access level for a block. A block agent, such as block agent 560, keeps track of the access level that has been granted to the node. In one embodiment, access levels for a block include the following:

None—This node has no rights for the given block.
Normal—The block can be shared by multiple nodes, but the normal lock protocol is used. Having normal access to a block of locks allows clients on different nodes to access data protected by locks in the same block. However, a normal access level for a block does not mean that the node has shared access to all data protected by locks in the block. Rather, the normal lock protocol described above with reference to FIGS. 1 through 3 is used by a lock agent for each lock in the block to request access to data protected by a given lock in the block from a corresponding lock master. As a result, having a normal access level for a block of locks may result in a node having exclusive access to data protected by some locks in the block, shared access to other data protected by other locks in the block, and no access to still other data.
Exclusive—This node has exclusive use of the block and data protected by locks in the block. Only one node can have exclusive access to a given block at the same time; when the node has exclusive access, that node is the only node using data protected by locks in the block. Locks in the block do not follow the normal lock protocol described above. Once an exclusive access level is granted for a block, certain locks within the block, called masterless locks, can be used independently of a lock master. Masterless locks are explained in further detail below.
Exclusive→Normal—This node's access to the block is being demoted from an exclusive access level to a normal access level.

One of skill in the art will recognize that other levels of access may be used according to the business needs of the organization, and that the access levels described herein are used as examples only and are not intended to be limiting.

In action 5.1, client 520 requests to initialize lock 550A of block 580. Lock agent 530 receives the request. The recipient of a request for access to data protected by a lock, such as lock agent 530, is also referred to herein as a receiving module. Lock agent 530 requests block agent 560 to initialize lock 550A of block 580 in action 5.2. In action 5.3, block agent 560 determines that block agent 560, and therefore node 110A, has not been granted access to block 580. Block agent 560 requests the maximum access level, exclusive access, to block 580 from block master 570 in action 5.4 by sending a message. The maximum access level is requested upon lock initialization to obtain the maximum access level that might later be requested by the client, exclusive access. The sender of a message to another node, such as block agent 560, is also referred to herein as a sending module. A lock manager, such as lock manager 570, may be considered to be comprised of multiple sending modules on multiple nodes or a single sending module with components on each node.

In action 5.5, block master 570 determines that block 580 is not in use by another node, and in action 5.6, block master 570 grants exclusive access to block 580 to block agent 560 on node 110A. Upon the grant of exclusive access to block 580, block agent 560 can grant exclusive access to any lock agent for a lock in the same block, block 580, on node 110A, without further communication between lock agent 530 and a lock master (not shown), as would be required under the normal lock protocol for normal locks. Because a block agent, such as block agent 560, obtains access to data protected by a lock in a block on behalf of a client, a block agent is referred to herein as an obtaining module.

In action 5.7, block agent 560 marks lock 550A as "masterless," indicating that subsequent requests for access to data 552A protected by lock 550A will not require lock agent 530 to communicate with a lock master (not shown). Furthermore, as long as lock 550A is masterless, lock agent 530 can grant access to data 552A protected by lock 550A to clients on node 110A as long as there is no contention among those clients for access to data 552A. In action 5.7, block agent 560 also adds lock 550A to a list of locks for block 580.

In action 5.8, block agent 560 notifies lock agent 530 that lock 550A is initialized, and in action 5.9, lock agent 530 informs client 520 that lock 550A is initialized. Now that lock 550A is initialized, client 520 can then request access to data 552A protected by lock 550A from lock agent 530 when client 520 is ready to read or update data 552A. A module or set of modules responsible for granting access to data protected by locks in a block, such as block agent 560 and block master 570, is referred to herein as a granting module. Block master 570 grants access to a given block to block agent 560, and block agent 560 grants access to data protected by locks in the block to clients.

FIG. 5B is a block diagram illustrating initialization of a second lock, lock 550B, in block 580, assuming that lock 550A has been initialized as described with reference to FIG. 5A. After client 520 is informed that lock 550A has been initialized in action 5.8, client 520 requests to initialize lock 550B in action 5.9. Lock agent 530, in action 5.10, requests block agent 560 to initialize lock 550B of block 580. In action 5.11, block agent 560 determines that lock 550B belongs to a block, here block 580, for which block agent 560 has already been granted exclusive access. Block agent 560 therefore does not need to communicate with block master 570 to request exclusive access to block 580 again. In action 5.12, block agent 560 marks lock 550B as "masterless" and adds lock 550B to the list of locks in block 580. In action 5.13, lock agent 530 informs client 520 that lock 550B is initialized for use. No messages are sent between nodes to grant access to a second lock in a block for which a block agent has already been granted exclusive access.

Comparing the initialization of the first and second locks in block 580 shown in FIGS. 5A and 5B, initialization of the first lock in a block is expensive, requiring a message between nodes. However, initialization of the second lock (and of subsequent locks) in a block does not require messages between nodes. In contrast to the grant of access to data shown in FIGS. 1 through 3, where a message between nodes is required for each lock, block locking saves messaging and is less expensive.

FIG. 6 is a flowchart of the actions taken by the block agent when a request to initialize a lock is received. The steps in the flowchart will be described with reference to block agent 560 of FIGS. 5A and 5B. In "Determine Block Number" step 610, block agent 560 determines a block number for the block for which access is requested. In some embodiments, the client provides a lock number that must be converted to a block number; in other embodiments, the block number may be provided directly by the requesting client.

Using the block number, in "Find or Create Data Structure for Block" step 620, block agent either finds an existing block data structure or creates one for the block. Block data structures are discussed further below with reference to FIG. 7. Control then proceeds to "Access Level for Block" decision point 630, where block agent 560 determines the level of access that has been granted for the node on which block agent 560 resides. If no access has been granted, control proceeds to "Request Exclusive Access to Block" step 640, where block agent 560 sends a message to a block master, such as block master 570, requesting exclusive access to the block represented by the block number determined in "Determine Block Number" step 610. Control then returns to "Access Level for Block" decision point 630.

If at "Access Level for Block" decision point 630, a normal access level has been granted for the block, control proceeds to "Add Lock to List of Locks in Block" step 660. In "Add Lock to List of Locks in Block" step 660, the lock for which initialization is being requested by the lock agent is added to a list of locks maintained in the block data structure for the block represented by the block number. Initialization of the lock is complete.

If at "Access Level for Block" decision point 630, exclusive access has been granted, control proceeds to "Mark Lock for which Initialization is Requested as 'Masterless'" step 650. In the embodiment shown, only the lock for which initialization is requested is marked as masterless, rather than all locks in the block. Subsequent locks in the block must be initialized before being granted masterless status. As described above, when a lock is masterless, the respective lock agent does not need to call a lock master to obtain access to data protected by the lock, because exclusive access has been granted to the node. Control then proceeds to "Add Lock to List of Locks in Block" step 660. Actions taken in "Add Lock to List of Locks in Block" step 660 were described above. Initialization of the lock is complete.

FIG. 7 is an example of data structures maintained by the block agent and block master. Block agent data structure 762 is maintained for each block by the block agent. Block agent data structure 762 includes a block identifier 764 and an "access level for this node" variable 766 indicating the level of access to the block that the node for the block agent has been granted.

Block agent data structure 767 also includes a list of locks for the block, here including locks 767A and 767B. As described above, the list of locks for the block is created as the locks are initialized. The list of locks contains locks that clients running on the node have initialized and are currently using. When data protected by a given lock are no longer needed, the thread using the lock de-initializes the lock, and the lock is removed from the list. Block agent data structure 767 also includes state information 768. For example, state information 768 may include indicators for masterless locks.

Block master data structure 772 is used by a block master to track access levels that the block master has granted to each node. Block master data structure 772 includes a block identifier 774 and variables for tracking access levels that have been granted for each node. In this example, block master data structure 772 includes access levels 776X, 776Y and 776Z for each of three nodes X, Y and Z. Block master data structure 772 also includes state information 778.

One of skill in the art will recognize that the data structures illustrated herein are examples only and are not intended to limit the scope of the invention. Many other types of data structures or file structures may be used to represent the data shown as part of the data structure examples given here.

FIG. 8 is a block diagram illustrating a first request to access data protected by a masterless lock, and a grant of access to the data. In action 8.1, client 520 requests exclusive access to data 552A protected by lock 550A. Referring back to FIG. 5A, lock 550A was initialized. Also at that time, in action 5.7, block agent 560 informed lock agent 530 that lock 550A is masterless. Returning to FIG. 8, in action 8.2, lock agent 530 determines that lock 550A is masterless, and therefore that access can be granted without sending a message to a lock master because exclusive access is already held for a masterless lock. In action 8.3, lock agent 530 grants exclusive access to data 552A protected by lock 550A to client 520.

Figure 9:
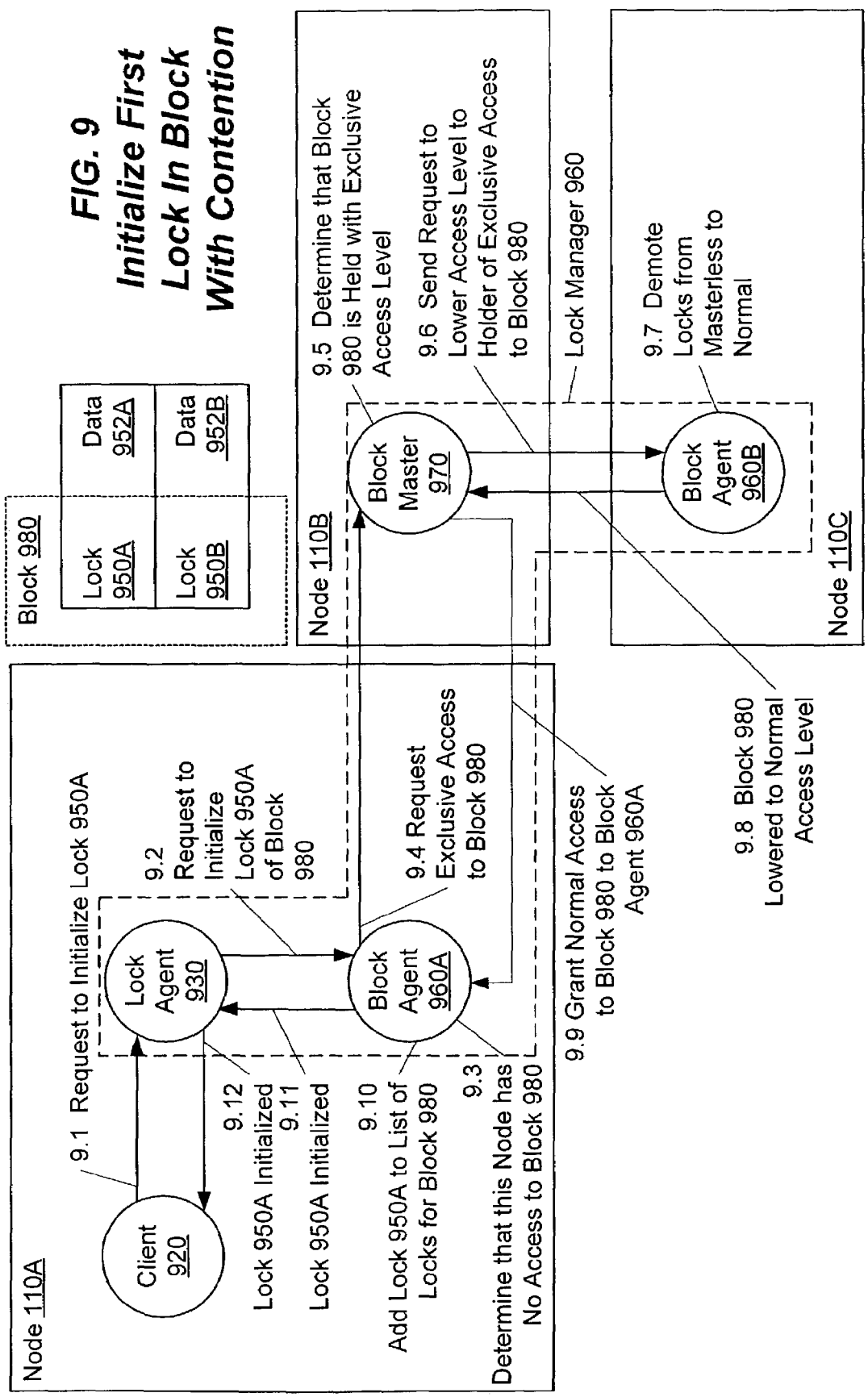
FIG. 9 is a block diagram illustrating initialization of a first lock in a block with contention for the data protected by locks in the block.

FIG. 9 is a block diagram illustrating initialization of a first lock in a block with contention for the data protected by locks in the block. Lock manager 960 includes lock agent 930 on node 110A, a corresponding lock master (not shown), block agent 960A on node 110A, a second block agent 960B on node 110C, and block master 970 on node 110B. In action 9.1, client 920 on node 110A requests to initialize lock 950A. Lock agent 930 receives the request and, in action 9.2, requests to initialize lock 950A of block 980. In action 9.3, block agent 960A determines that node 110A has not been granted access to block 980. A message is required in action 9.4 to request exclusive access to block 980.

In action 9.5, block master 970 receives the request for exclusive access to block 980 and determines that block 980 is already exclusively held by another node, node 110C. At this point, block master 970 has two options. Either block master 970 can wait for the access level to block 980 to be voluntarily lowered, or block master 970 can send a request to lower the access level with which block 980 is being used. Granting normal access to block agent 930A is not an option, because block agent 960B holds block 980 with exclusive access. In action 9.6, block master 970 sends a request to lower the access level for block 980 to the holder of exclusive access to block 980, block agent 960B running on node 110C.

In the embodiment shown in FIG. 9, a block agent receiving a request to revoke exclusive access is required to lower the access level at which the block agent holds the lock. In this example, block agent 960B is using some locks in block 980, so the lock list for block 980 includes some locks. Consequently, the block access level can be lowered to a normal access level, but the block cannot be lowered to an access level of none. In contrast, when the lock list for a block is empty, the block can be lowered to an access level of none.

In action 9.7, to reduce the access level from exclusive to normal access, block agent 960B demotes all of the locks in the list of locks for block agent 960B from masterless to normal locks. In this example, block agent 960B currently holds only lock 950A, which is converted to a normal lock.

In action 9.8, block agent 960B sends a message to block master 970 indicating that the access level for block 980 has been lowered to a normal access level, indicating that all locks have been converted from masterless to normal locks. In action 9.9, block master 970 grants normal access to block 980 to block agent 960A. In action 9.10, block agent 960A adds lock 950A to the list of locks for block 980, and in action 9.11, block agent 960A informs lock agent 930 that 950A is initialized. In action 9.12, lock agent 930 informs client 920 that lock 950A has been initialized.

Figure 10:
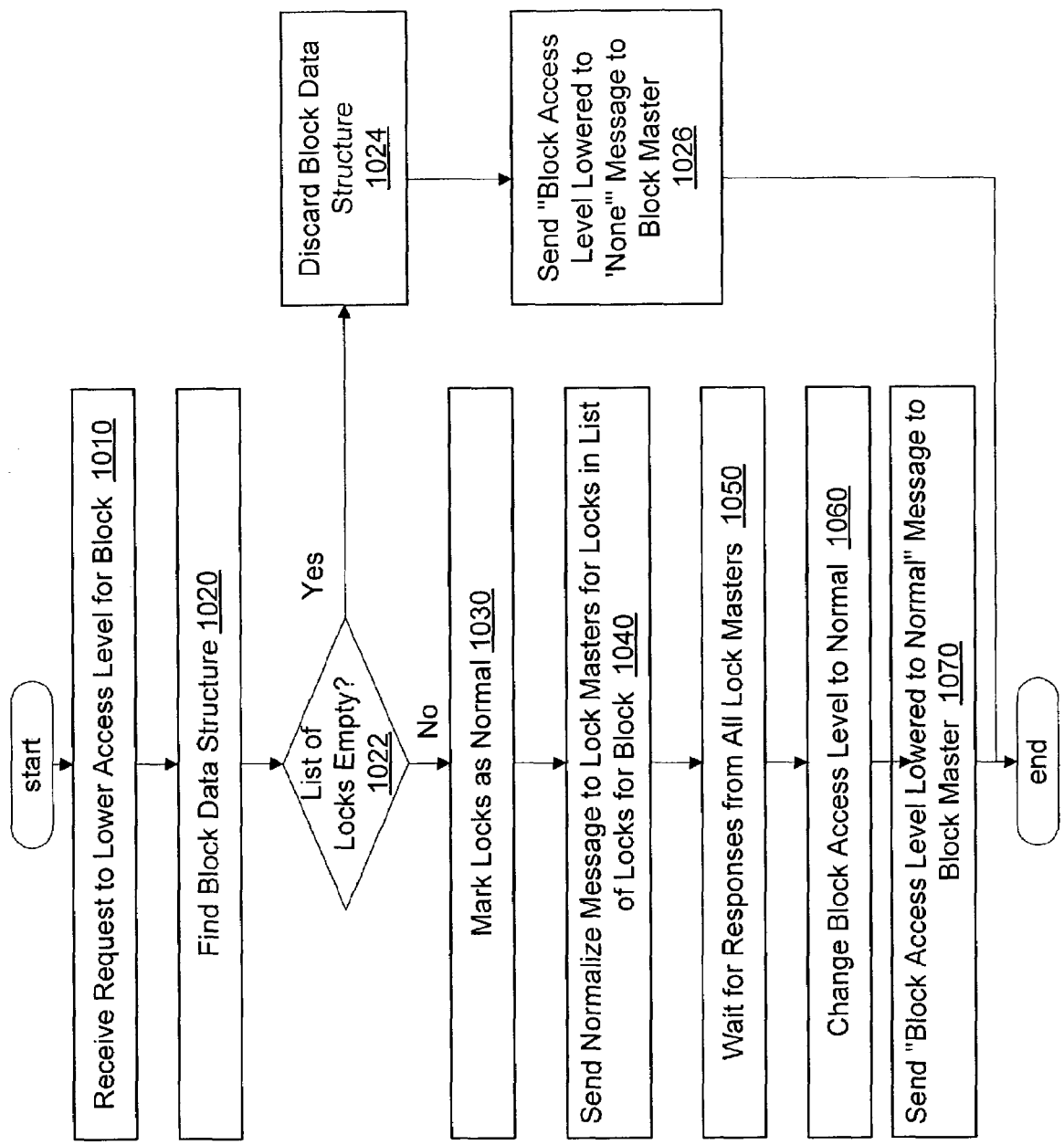
FIG. 10 is a flowchart showing actions taken by the block agent upon receiving a request to lower the access level for a block of locks.

FIG. 10 is a flowchart showing actions taken by a block agent, such as block agent 960B, upon receiving a request to lower the access level with which the block agent is using a block of locks. For example, an existing block of locks can be lowered from an exclusive access level to a normal access level, or from a normal access level to an access level of none. "Demoting" a block of locks from exclusive to normal access enables other nodes to share the data protected by locks in the same block by using the normal lock protocol. Demoting a block of locks from a normal access level to an access level of none enables the data protected by the block of locks to be available for exclusive access by another node.

A block agent cannot lower the access level for a block from normal to an access level of none unless the block agent has no locks in the block, and therefore there is a risk that the request will not be granted. The block master can weigh the importance of granting exclusive access to the requesting client against the cost of the extra messages if exclusive access is not obtained.

Referring to FIG. 10, in "Receive Request to Lower Access Level for Block" step 1010, a block agent receives a request to lower the access level with which the block agent is using a block from the block master. In "Find Block Data Structure" step 1020, the block agent finds the block data structure associated with the block of locks for which a lower access level is requested. Control proceeds to "List of Locks Empty" decision point 1022, where a determination is made whether any locks are currently active for the block. This determination can be made by referencing the list of locks for the block, such as the list of locks 767A and 767B of block agent data structure 732 of FIG. 7.

If in "List of Locks Empty" decision point 1022, the list is empty, control proceeds to "Discard Block Data Structure" step 1024, where the block data structure is discarded. Control then proceeds to "Send 'Block Access Level Lowered to None' Message to Block Master" step 1026, where a message is sent to the block master indicating that all locks in the block have been de-initialized by the block agent.

If in "List of Locks Empty" decision point 1022, the list is not empty, control proceeds to "Mark Locks as Normal" step 1030. At this step, exclusive access to the block of locks must be lowered, and therefore all communication for a lock within the block requires communication with a lock master and therefore requires a normal lock. Control then proceeds to "Send Normalize Message to Lock Masters for Locks in List of Locks for Block" step 1040. In response, each lock master sends a message indicating that the lock has been converted to a normal lock.

In "Wait for Responses from All Lock Masters" step 1050, the block agent waits until all lock masters have responded to the normalize messages. Control then proceeds to "Change Block Access Level to Normal" step 1060, where the block agent changes the access level for the block of locks to a normal access level. Control then proceeds to "Send 'Block Access Level Lowered to Normal' Message to Block Master" step 1070. In this step, the block agent sends a message indicating that the block of locks that was held exclusively has been lowered to a normal access level.

Lowering the block access level from exclusive to normal does not mean that all locks in the block of locks also have only shared access. Even a block that has a normal access level can have individual locks in the block that are held exclusively. The difference between a block of locks held exclusively and a block of locks held with normal access is that the block of locks held with normal access cannot have masterless locks. Therefore, by demoting a block of locks from exclusive to normal access, all locks in the block are converted from masterless to normal locks, as described above with reference to "Mark Locks as Normal" step 1030.

FIGS. 9 and 10 pertain to block contention, where two nodes are trying to use data protected by locks in the same block. This contention resulted when both nodes initialized a lock (not necessarily the same lock) in the same block. If the two nodes are using different locks in the block, block contention can occur even though there is no contention for the same lock. In one embodiment, blocks are divided into portions, called sub-blocks, that are used to overcome this problem.

Blocks divided into sub-blocks enable a given access level to be granted to some, but not all, sub-blocks in a block. When a request is received to access data protected by locks in a given sub-block, an appropriate access level can be granted for the given sub-block (only a portion of the block) as long as there is no contention for the locks in the given sub-block.

Figure 11:
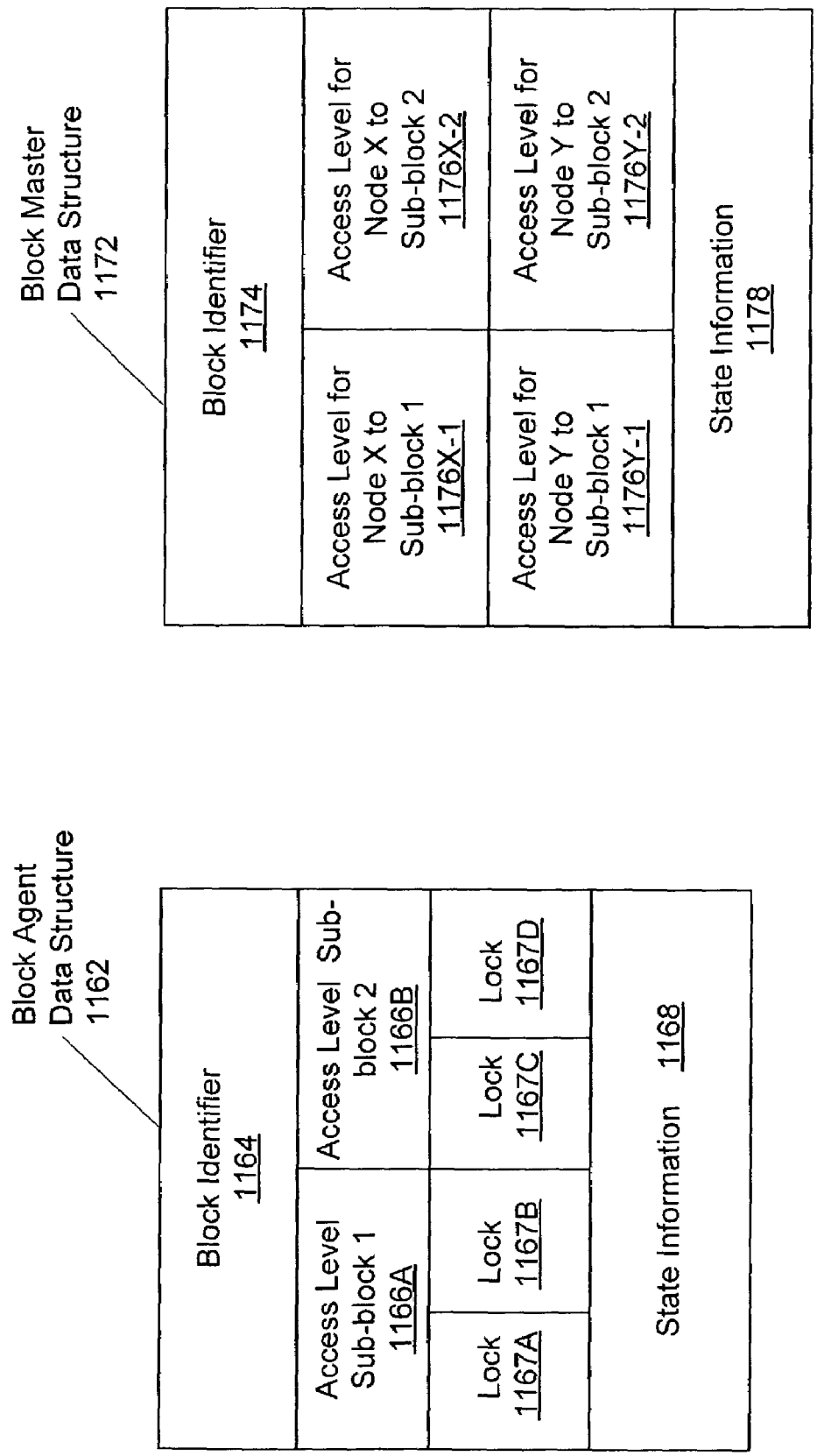
FIG. 11 is an example of data structures maintained by the block agent and block master when blocks of locks are divided into sub-blocks.

FIG. 11 is an example of data structures maintained by the block agent and block master when blocks of locks are divided into sub-blocks. Block agent data structure 1162 includes a block identifier 1164 and access levels granted for each sub-block in the block, represented here by "Access level Sub-block 1" variable 1166A and "Access Level Sub-block 2" variable 1166B. A list of locks for each sub-block is also maintained; in the example, sub-block 1 has locks 1167A and 1167B in its list of locks, and sub-block 2 has locks 1167C and 1167D in its list of locks. Block agent data structure 1162 also includes state information 1168.

Block master data structure 1172 includes a block identifier 1174 and access levels granted to each node for each sub-block in the block, represented here by "Access level for Node X to Sub-block 1" variable 1176X-1, "Access Level for Node X to Sub-block 2" variable 1176X-2, "Access level for Node Y to Sub-block 1" variable 1176Y-1, "Access Level for Node Y to Sub-block 2" variable 1176Y-2. Block agent data structure 1172 also includes state information 1178.

Figure 12:
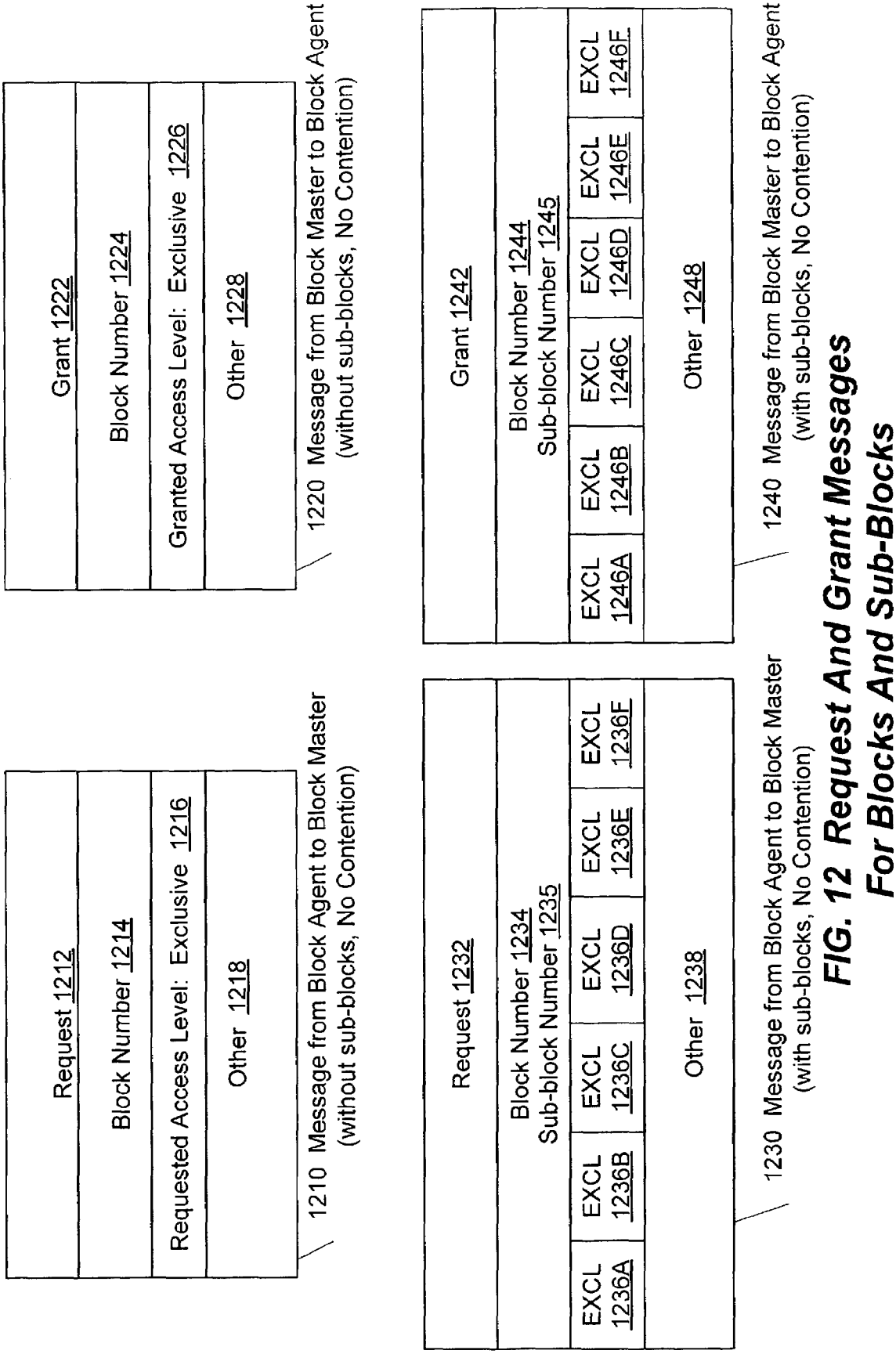
FIG. 12 is an example of request and grant messages sent between the block agent and block master, with and without sub-blocks.

FIG. 12 is an example of request and grant messages sent between the block agent and block master, with and without sub-blocks. Message 1210 is an example of a request for exclusive access from a block agent to a block master. Message 1210 includes fields request 1212, indicating that the message is a request, and block number 1214, indicating the block number for which the request is made. The block referred to by block number 1214 is not divided into sub-blocks, and the request is made when no contention exists. Requested access level 1216 indicates the access level requested for the block, in this case, exclusive access. Other field 1218 can include other parameters for the request.

Message 1220 is an example of a grant of the request for exclusive access to a block. The grant message is sent from a block master to a block agent. Message 1220 includes fields grant 1222, indicating that the message is a grant of an access level, and block number 1224, indicating the block number for which the grant of access is made. The block referred to by block number 1224 is not divided into sub-blocks, and the request is made when no contention exists. Granted access level 1226 indicates the access level granted, in this case, exclusive access. Other field 1218 can include other parameters for the grant.

Message 1230 is an example of a request for exclusive access to a sub-block from a block agent to a block master. Message 1230 includes fields request 1232, indicating that the message is a request, block number 1234, and sub-block number 1235, indicating the respective block and sub-block numbers for which the request is made. Requested access level fields 1236A through 1236F indicate the access level requested for each sub-block in the requested block designated in block number 1234, in this case, exclusive access. Other field 1238 can include other parameters for the request.

Message 1240 is an example of a grant of the request for exclusive access to a sub-block when no contention exists. The grant message is sent from a block master to a block agent. Message 1240 includes fields grant 1242, indicating that the message is a grant of access levels, block number 1244, and sub-block number 1245, indicating the respective block and sub-block numbers for which the request for access was made. Granted access levels 1246A through 1246F indicate the access level granted, in this case, exclusive access for all sub-blocks because no contention existed for any of the sub-blocks in the block. Other field 1248 can include other parameters for the grant.

Grant message 1240 shows one of the advantages of block locking. In this example, the block agent can obtain exclusive access to one or more sub-blocks in a block with a single request message, such as request message 1232. Exclusive access to a particular sub-block can be granted when the associated locks for the respective sets of data represented by the sub-block are not in use. Exclusive access to all sub-blocks can be granted when none of the associated locks in the block are in use.

In the absence of contention for a block, block locking with and without sub-blocks is similar. Differences arise when data protected by locks in a given block are in contention; i.e., there is contention for the block.

Figure 13:
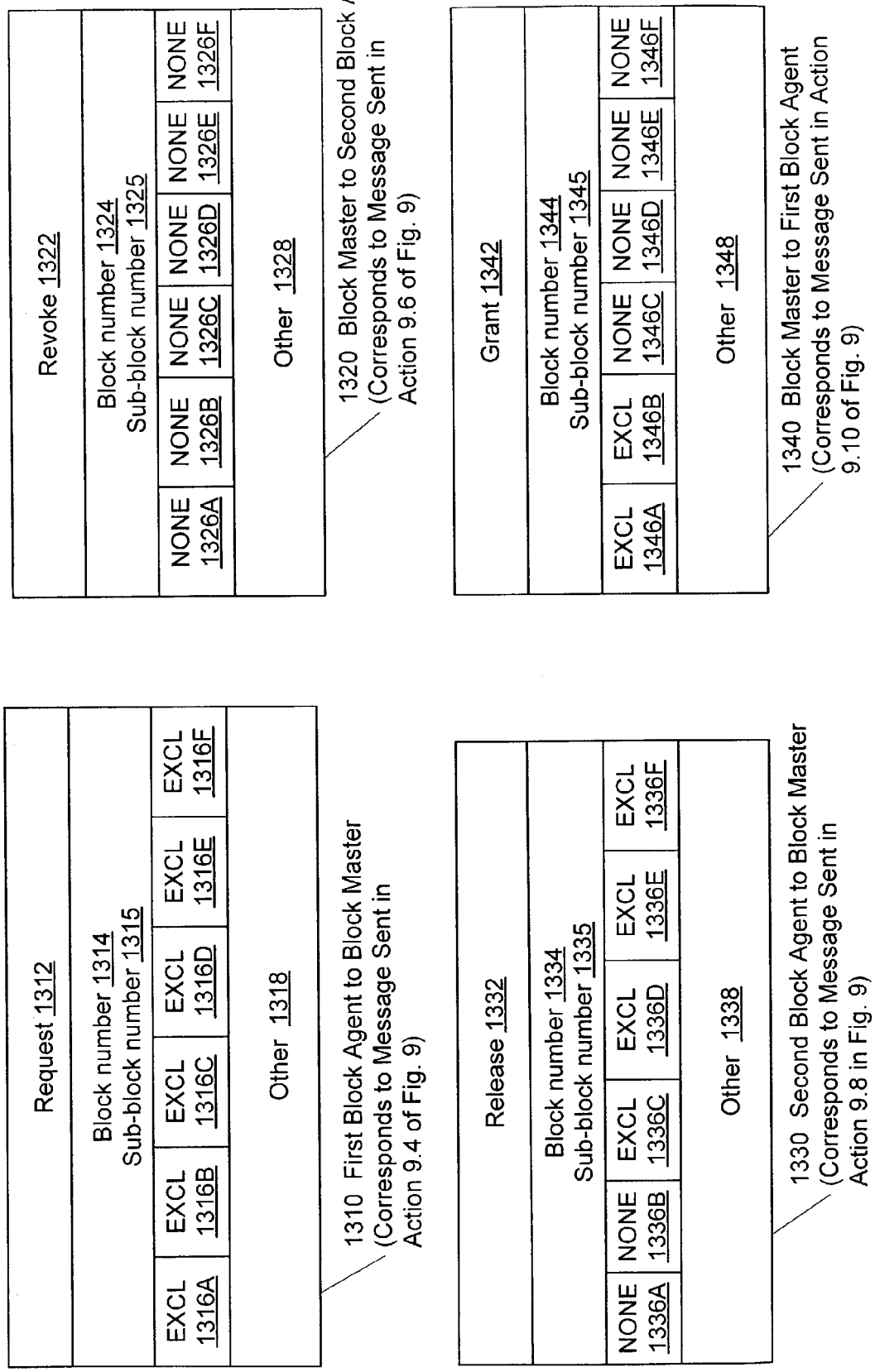
FIG. 13 is an example of request, revoke, release, and grant messages sent between the block agent and block master, when blocks of locks are divided into sub-blocks.

FIG. 13 is an example of request, revoke, release, and grant messages sent between the block agent and block master, when blocks are divided into sub-blocks. Message 1310 is an example of a request for exclusive access to a sub-block from a block agent to a block master. Message 1310 includes fields request 1312, indicating that the message is a request, block number 1314, and sub-block number 1315, indicating the respective block and sub-block numbers for which the request is made. The request is made for the specific sub-block requested by the client; i.e., for a portion of the block. Requested access level fields 1316A through 1316F indicate the access level requested for each sub-block, in this case, exclusive access. The same access level is requested for all other sub-blocks in the block in addition to the specific sub-block requested. Other field 1318 can include other parameters for the request. A message such as message 1310 is sent in action 9.4 of FIG. 9.

Message 1320 is an example of a revocation request to lower the access level to a sub-block when contention exists. The revocation message is sent from a block master to a second block agent when a first block agent has requested access to data protected by a lock in a block being used by the second block agent. Message 1322 includes fields revoke 1322, indicating that the message is revocation of an access level, and sub-block number 1324, indicating the sub-block number for which the revocation request is made. Revocation access levels 1326A through 1326F indicate the access level to which revocation is requested, in this case, an access level of none for all sub-blocks. Other field 1328 can include other parameters for the grant. A message such as message 1320 is sent in action 9.6 of FIG. 9.

Message 1330 is an example of a release of access to a sub-block when a revocation message is received due to contention. The release message is sent from a block agent for a block for a node that has been requested to lower its access level (a second block agent as opposed to the block agent that sent the request message) to a block master. Message 1330 includes fields release 1332, indicating that the message is a release of an access level, and sub-block number 1334, indicating the sub-block number for which the access level has been lowered. Released access levels 1326A through 1326F indicate the access levels to which the sub-blocks in the block are lowered. In this case, the first and second sub-blocks in the block have been released to an access level of none, but exclusive access for the third through sixth sub-blocks has been retained by the second block agent. Other field 1328 can include other parameters for the release of an access level. A message such as message 1330 is sent in action 9.8 of FIG. 9.

Message 1340 is an example of a grant of the request for exclusive access to a sub-block when contention exists at a block level but not at a sub-block level. The grant message is sent from a block master to a block agent. Message 1340 includes fields grant 1342, indicating that the message is a grant of access levels, and sub-block number 1344, indicating the sub-block number for which the request for access was made. Granted access levels 1346A through 1346F indicate the access levels granted for each sub-block. In this case, exclusive access has been granted for the first and second sub-blocks, and no access is granted for the third through the sixth sub-blocks. Exclusive access is thereby granted to a portion of the block represented by the first and second sub-blocks. As described above, the block agent was unable to lower the access level for all sub-blocks to an access level of none because some of the sub-blocks were in use. Other field 1248 can include other parameters for the grant. A message such as message 1340 is sent in action 9.9 of FIG. 9.

While the example of message 1340 is for a single requester, this example illustrates that successive requests to data protected by locks in different sub-blocks can be granted. If a first requester requests and obtains exclusive access to a first sub-block, a second requester can request and obtain exclusive access to a second sub-block in the same block.

Figure 14:
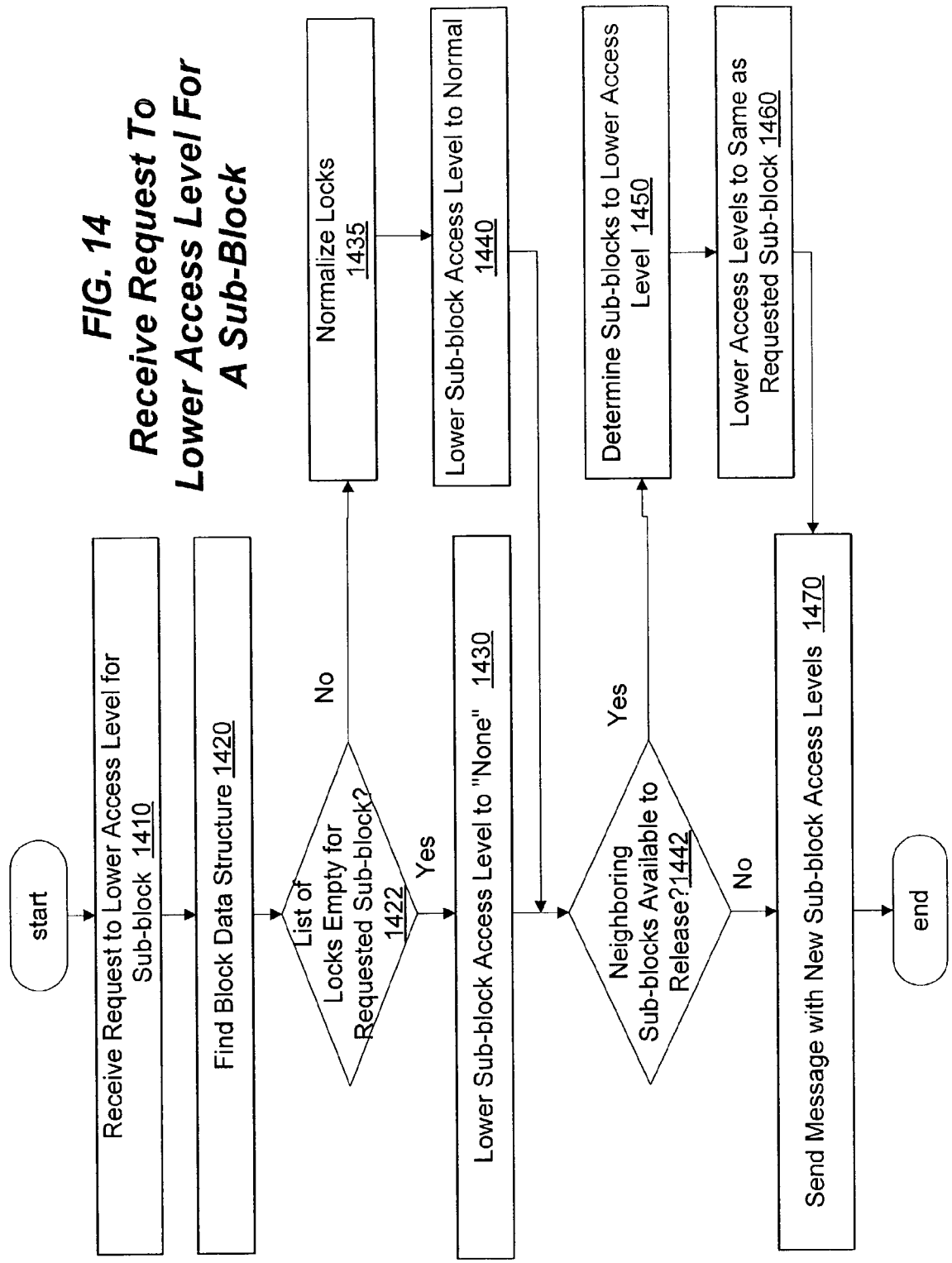
FIG. 14 is a flowchart of actions taken by the block agent when a request to lower the access level held for a sub-block in a block of locks.

FIG. 14 is a flowchart of actions taken by the block agent when a request to lower the access level for a sub-block is received. In "Receive Request to Lower Access Level for Sub-block" step 1410, a request is received by the block agent to lower the access level for a specific sub-block. In "Find Block Data Structure" step 1420, a data structure for the block including the sub-block of interest is found. Control transitions to "List of Locks Empty for Requested Sub-block" decision point 1422. If the list of locks is empty, control proceeds to "Lower Sub-block Access Level to 'None'" step 1430. If the list of locks is not empty, control proceeds to "Normalize Locks" step 1435.

In "Normalize Locks" step 1435, to convert the masterless locks to locks with a master, the block agent sends a message for each lock. The message is sent to the node on which the lock master process would reside if the lock had a master, and a lock master is started on that node. The message also tells the new master the access level that is being held for that lock on the sending node. Control then proceeds to "Lower Sub-block Access Level to Normal" step 1440.

In "Lower Sub-block Access Level to Normal" step 1440, access to the requested sub-block is lowered to a normal access level. Control then proceeds to "Neighboring Sub-blocks Available to Release" decision point 1442.

In "Lower Sub-block Access Level to 'None'" step 1430, access to the requested sub-block is released. Control then proceeds to "Neighboring Sub-blocks Available to Release" decision point 1442.

At "Neighboring Sub-blocks Available to Release" decision point 1442, some of the locks in the block including the sub-blocks may be in use and the block agent cannot release all sub-blocks at the same time. In this case, the block agent attempts to split the block in some equitable way with the block master, retaining some locks and releasing others. If the block agent releases too many locks, then further lock requests may not be granted because the lock is not held on a block (sub-block) to which the block agent has access. If the block agent releases too few locks, then the chances of the requesting node obtaining the access needed are jeopardized.

Consider the example shown in FIG. 13, where each block contains sub-blocks 1-6, and the block master sends a revocation request in message 1320 for sub-block 1 requesting that the access level for sub-block 1 be lowered to none. Assume that the block agent holds the entire block with exclusive access but only has locks in sub-blocks 5 and 6. The block agent can be implemented to use appropriate algorithms for selectively determining which additional sub-blocks are released. For example, since sub-blocks 2 through 4 are not locked, the block agent can make a decision whether to retain exclusive access to additional sub-blocks 2 through 4, or whether to release the exclusive access level on sub-blocks 2 through 4 to an access level of none (the requested access level). The block agent can divide access to these sub-blocks with the block master, releasing access to, for example, sub-block 2 and retaining exclusive access to the sub-blocks 3 and 4. Sub-block 2 is released in addition to the requested release of sub-block 1. As shown in message 1330 of FIG. 13, release message 1332 informs the block master that the block agent has released the lock on sub-blocks 1 and 2 to an access level of none but retained exclusive access to sub-blocks 3 through 6. Exclusive access to the portion of the block including sub-blocks 1 and 2 is obtained by the block agent.

The present invention is not limited to a single level of sub-blocks. Sub-blocks can be divided into sub-sub-blocks, and so on for any number of levels of sub-blocks. Data structures such as block agent data structure 1162 and block master data structure 1172 of FIG. 11 would be revised accordingly to keep track of access levels for each level of sub-blocks. The variables to keep track of access levels for each level of sub-blocks can be provided by the client when the client initializes a lock for each sub-block. Furthermore, messages 1230 and 1240 of FIG. 12 and messages 1310 through 1340 of FIG. 13 would also include additional variables for tracking the multiple levels of sub-blocks.

One of the advantages of the present invention is that client applications do not need extensive revisions to take advantage of block locking. In one embodiment, a client application provides a block number that the client application has pre-defined to designate a particular set of locks. In another embodiment, the client application provides the lock number itself, and a component of a lock manager, such as lock agent 530 of lock manager 560 of FIG. 5, converts the lock number to a block number. An application programming interface for the lock manager, such as lock agent 530, can include a command to associate a block number with a group of locks. This command can be an initialization command, a request command for requesting access to a set of data protected by a lock, a lock command, or some other command made before the client application obtains access to the data protected by the lock. Once the lock manager has the information grouping locks into blocks, other commands supporting locks only can be used, and the lock manager can determine the block number from the lock information.

The block number supplied by the client application is not required to correspond to a physical entity, such as a block on a disk, a block of memory, or another type of physical block. The block number is used to group locks for data that the client application predicts may be accessed at close points in time to save messaging costs over requesting the data locks individually.

In some embodiments, the client application can also supply a name space that contains the block numbers, allowing the user application to have multiple sets of block numbers. For example, a client application can have one set of numbers for disk blocks, and another set for files. Each of these two sets of numbers has a respective name space. In this embodiment, block data structures are associated with a respective name space.

According to the present invention, nodes in a cluster assign a lock to a given block consistently across all of the nodes. The same lock is not included in different blocks, and the same lock is not used on one node with blocking and on another node without blocking. Different blocks can have different numbers of locks.

In addition to "demoting" a node to have a lower level of access, a node can be "promoted" to a higher level of access, such as from shared access to exclusive access. A promotion could occur when a block master notices that only one node has a lock on a particular set of data, and the lock is held at a shared access level. Such a situation could arise as a result of a node leaving a cluster or other distributed system (to be discussed in more detail below), or when node voluntarily releases a block that the node is not longer using.

When a node's access level is "promoted," changes in the locks may be necessary. For example, normal locks may need to be changed to masterless locks. Changing a lock from normal to masterless includes setting a state variable in the block data structure, and does not require messaging.

An organization implementing block locking may wish to consider the following policy questions:

1) Should block locking be used? The block agent can track whether block locking is saving processing time by counting messages for each block. If no time is being saved, block locking can be disabled.

2) How long should the block agent hold a block level, once all of its locks are released? Once the locks are released, the block agent can send a release message to the block master, informing the block master that data protected by locks in the block are no longer locked. If the block agent waits too long to inform the block master, the block master may send a revocation request. If the block agent relinquishes the block too quickly, the block agent may have to make additional requests to access data for that block and wait for a block request message and response.

3) How often should a block agent try to upgrade a block that it holds with shared access? Since promotions normally fail, the block agent should attempt to upgrade only periodically.

4) Should locks be monitored for excessive state changes? If too much contention for the sub-blocks in a block exists, the block master can revoke the entire block to shared access on every participating node, rather than incur overhead of revocations, releases and block splitting.

5) When the block master for a lock receives a request for exclusive access and conflicting nodes hold shared access, should the block master try to revoke the conflicting nodes to a "no lock" access level, or should the block master instead grant the original request at a shared access level?

In addition to these policy questions, lock blocking should be flexible. For example, changes to the cluster membership should be accommodated. Old nodes may drop out, and new ones may be added; the block agents and block master must be able to continue to lock and unlock data during these changes.

In one embodiment, the nodes exchange information about lock levels currently held; this allows block masters for locks to be reconstructed within the new cluster membership. Each block agent tells its new block master about any outstanding locking requests that might have been lost, so that the block masters can begin processing those requests.

Masterless locks require no recovery at all from a change in cluster membership, since no other node is aware of them. Normal locks are recovered by communicating with the block master for the lock. Finally, if the block access level is Exclusive->Normal, then locks can be recovered normally; once the locks are recovered, the demotion is complete.

Because each block is completely independent of any other block, block masters can be distributed between nodes in the cluster. In one embodiment, the block number in the procedure is used for selecting a master. For example, in a 4-node cluster, the block master on node 0 might track blocks 0, 4, 8, 12, etc. Node 1 might track blocks 1, 5, 9, 13, and so on.

The advantages of block locking are many. Key features include the following:

- Block locking does not require restructuring the code of calling applications. The basic locks that a calling application creates and manipulates are unchanged.
- Block locking is optional. An administrator of a calling application can choose whether to assign a lock to a block.
- Block locking allows the calling application to predict future lock usage by assigning locks to blocks in a way that is completely determined by the calling application.
- Block locking allows the cluster lock manger to exploit this prediction by creating masterless locks, once the first lock in a block has been initialized. This increases performance by reducing message costs.
- Under contention the lock manager automatically splits the blocks into sub-blocks, reducing the effectiveness of the blocking, but still preserving some of its benefits.
- Block locking provides a way for multiple nodes to access locks in the same sub-block, through demotion of the masterless locks to normal locks.
- Block locking fits easily into an existing recovery scheme.
- Block locking allows all nodes to share the burden of hosting the lock master code and data.

An Example Computing and Network Environment

Figure 15:
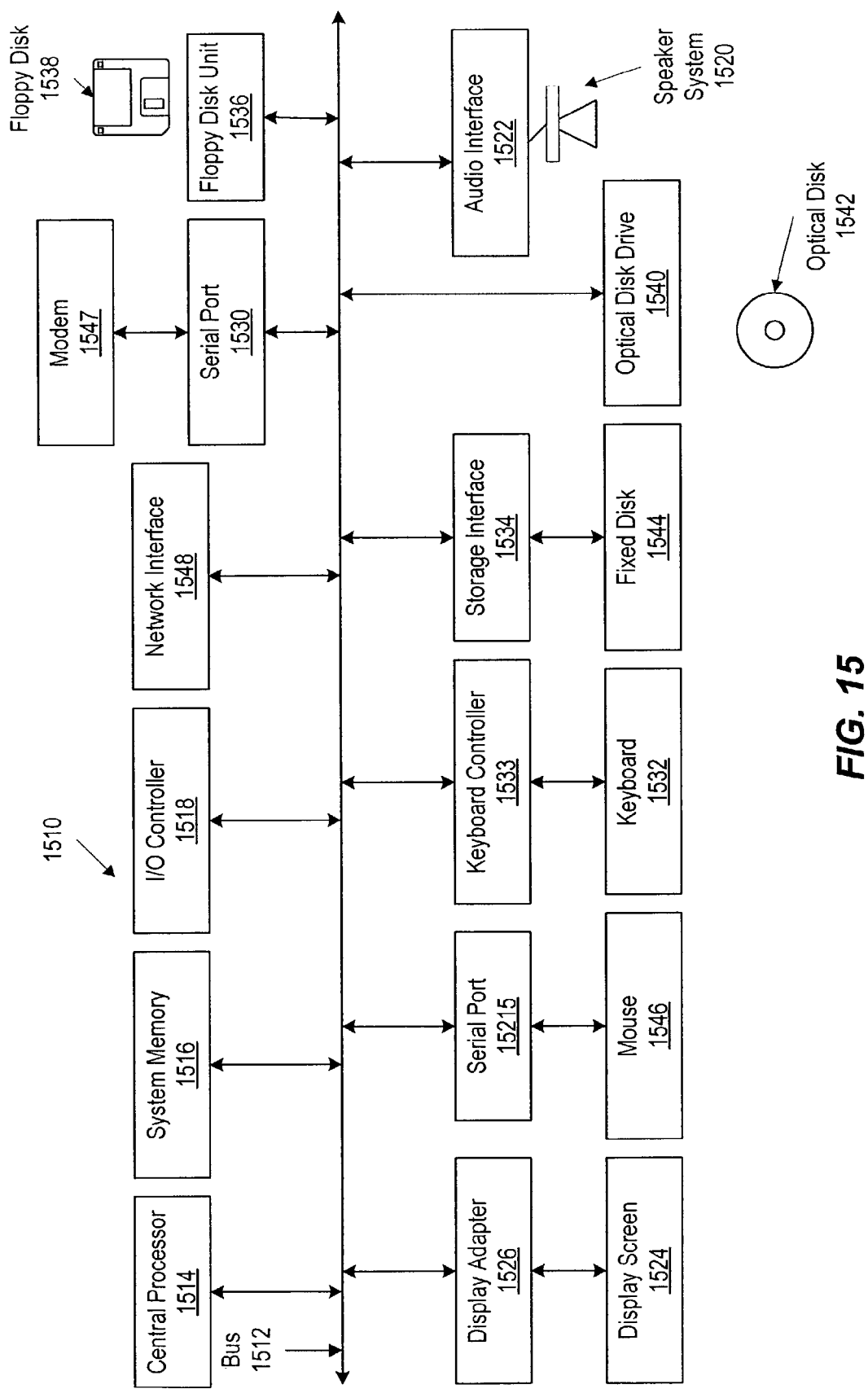
FIG. 15 is a block diagram illustrating a computer system suitable for implementing embodiments of the present invention.

FIG. 15 depicts a block diagram of a computer system 1510 suitable for implementing the present invention. Computer system 1510 includes a bus 1512 which interconnects major subsystems of computer system 1510 such as a central processor 1514, a system memory 1516 (typically RAM, but which may also include ROM, flash RAM, or the like), an input/output controller 1518, an external audio device such as a speaker system 1520 via an audio output interface 1522, an external device such as a display screen 1524 via display adapter 1526, serial ports 1528 and 1530, a keyboard 1532 (interfaced with a keyboard controller 1533), a storage interface 1534, a floppy disk drive 1536 operative to receive a floppy disk 1538, and a CD-ROM drive 1540 operative to receive a CD-ROM 1542. Also included are a mouse 1546 (or other point-and-click device, coupled to bus 1512 via serial port 1528), a modem 1547 (coupled to bus 1512 via serial port 1530) and a network interface 1548 (coupled directly to bus 1512).

Bus 1512 allows data communication between central processor 1514 and system memory 1516, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 1510 are generally stored on and accessed via a computer readable medium, such as a hard disk drive (e.g., fixed disk 1544), an optical drive (e.g., CD-ROM drive 1540), floppy disk unit 1536 or other storage medium. Additionally, applications may be in the form of electronic signals modulated in accordance with the application and data communication technology when accessed via network modem 1547 or interface 1548.

Storage interface 1534, as with the other storage interfaces of computer system 1510, may connect to a standard computer readable medium for storage and/or retrieval of information, such as a fixed disk drive 1545. Fixed disk drive 1544 may be a part of computer system 1510 or may be separate and accessed through other interface systems. Many other devices can be connected such as a mouse 1546 connected to bus 1512 via serial port 1528, a modem 1547 connected to bus 1512 via serial port 1530 and a network interface 1548 connected directly to bus 1512. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 15 to be present to practice the present invention. The devices and subsystems may be interconnected in different ways from that shown in FIG. 15. The operation of a computer system such as that shown in FIG. 15 is readily known in the art and is not discussed in detail in this application. Code to implement the present invention may be stored in computer-readable storage media such as one or more of system memory 1516, fixed disk 1544, CD-ROM 1542, or floppy disk 1538. Additionally, computer system 1510 may be any kind of computing device, and so includes personal data assistants (PDAs), network appliance, X-window terminal or other such computing device. The operating system provided on computer system 1510 may be MS-DOS®, MS-WINDOWS®, OS/2®, UNIX®, Linux® or other known operating system. Computer system 1510 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 1510). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 16:
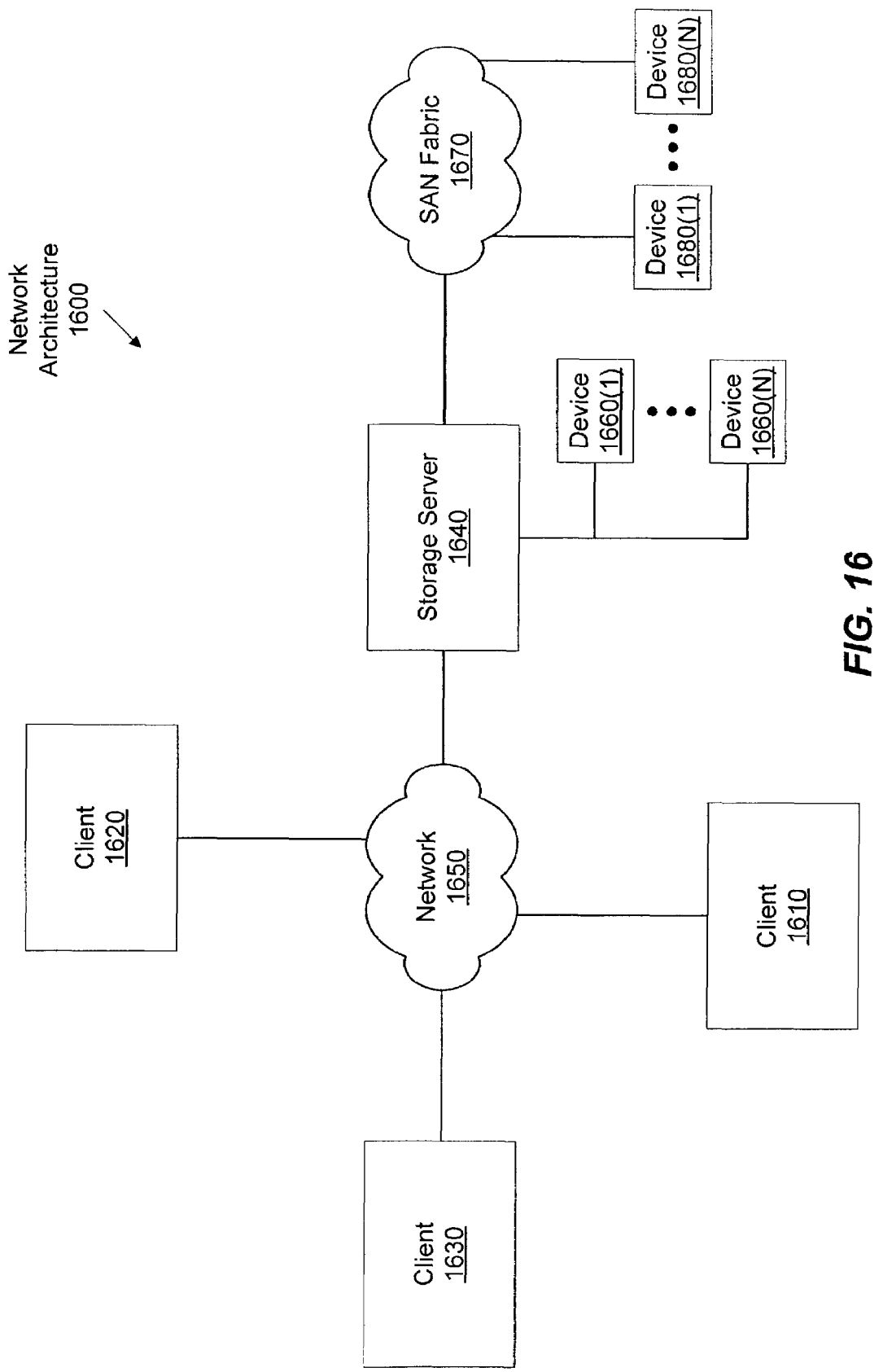
FIG. 16 is a block diagram illustrating a network environment in which locking according to embodiments of the present invention may be used.

FIG. 16 is a block diagram depicting a network architecture 1600 in which client systems 1610, 1620 and 1630, as well as a storage server 1640 (any of which can be implemented using computer system 1510), are coupled to a network 1650. Storage server 1640 is further depicted as having storage devices 1660(1)-(N) directly attached thereto. Storage server 1640 is also connected to a SAN fabric 1670, although connection to a storage area network is not required for operation of the invention. SAN fabric 1670 supports access to storage devices 1680(1)-(N) by storage server 1640, and so by client systems 1610, 1620 and 1630 via network 1650.

With reference to computer system 1510, modem 1547, network interface 1548 or some other method can be used to provide connectivity from computer system 1510 to network 1650. Client systems 1610, 1620 and 1630 are able to access information on storage server 1640 using, for example, a web browser or other client software (not shown). Such a client allows client systems 1610, 1620 and 1630 to access data hosted by storage server 1640 or one of storage devices 1660(1)-(N) or 1680(1)-(N). FIG. 16 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
receiving a request for exclusive access to a first set of data, wherein
the first set of data is associated with a first lock of a plurality of locks,
a first block comprises the plurality of locks, and
each lock of the plurality of locks in the first block is associated with a respective set of data;
obtaining exclusive access to the first block, wherein
said obtaining exclusive access to the first block comprises a block agent sending a single message to a block master, and
the single message comprises a request to change an access level for all locks of the plurality of locks in the first block; and
granting exclusive access to a plurality of sets of data associated with a respective plurality of the locks in the first block, wherein
said granting exclusive access to the plurality of sets of data associated with the respective plurality of locks occurs subsequent to said obtaining exclusive access to the first block, and
said granting exclusive access is performed by the block agent, wherein said receiving, said obtaining, and said granting are performed by at least one processor, wherein the at least one processor are executing instructions to implement a block agent.

2. The method of claim 1, further comprising:
granting exclusive access to all of the sets of data associated with the respective locks in the first block if no lock in the first block is in use.

3. The method of claim 2, further comprising:
sending one message to request exclusive access to the first set of data, wherein only the one message is sent to obtain the exclusive access to the sets of data associated with the respective locks in the first block.

4. The method of claim 1, further comprising:
sending one message to request exclusive access to the first set of data.

5. The method of claim 4 wherein
only the one message is sent to obtain exclusive access to the first set of data and exclusive access to a second set of data associated with a second lock of the plurality of locks in the first block.

6. The method of claim 1, further comprising:
granting exclusive access to the first set of data to a requester from which the request was received.

7. The method of claim 1, wherein
the receiving the request comprises receiving the request from a requester on a first node;
the obtaining the exclusive access to the first block comprises:
sending one message to request exclusive access to the first block to a second node, wherein
only the one message is sent to the second node to obtain the exclusive access to the first block.

8. The method of claim 1 further comprising:
receiving a second request for exclusive access to a second set of data from a second requester on a second node, wherein
a second lock associated with the second set of data is in the first block, and
the receiving the request for exclusive access to the first set of data comprises receiving the request from a first requester on a first node;
granting the request for exclusive access to the first set of data to the first requester;
granting the second request to the second set of data to the second requester when the first lock and the second lock are in different portions of the first block.

9. A computer-implemented system comprising:
at least one processor;
a memory coupled to the at least one processor, wherein the memory stores instructions executable by the at least one process to implement;
a receiving module to receive a request for exclusive access to a first set of data, wherein
the first set of data is associated with a first lock,
a first block comprises a plurality of locks,
the plurality of locks in the first block comprises the first lock, and
each lock of the plurality of locks in the first block is associated with a respective set of data;
a block obtaining module to obtain exclusive access to the first block, wherein
said obtaining exclusive access to the first block comprises a block agent sending a single message to a block master, and
the single message comprises a request to change an access level for each lock in the first block; and
a lock obtaining module to obtain exclusive access to a plurality of sets of data associated with a respective plurality of locks in the first block, wherein
the lock obtaining module is configured to obtain exclusive access to the plurality of sets of data subsequent to the block obtaining module obtaining exclusive access to the first block, and
the lock obtaining module is configured to obtain exclusive access to the plurality of sets of data from the block agent.

10. The system of claim 9, wherein
the exclusive access to the sets of data associated with the respective locks in the first block comprises exclusive access to all of the sets of data associated with the respective locks in the first block when no lock in the first block is in use.

11. The system of claim 9, wherein the memory stores instructions executable by the at least one processor to implement:
a sending module to send one message to request exclusive access to the first set of data to a second node, wherein
only the one message is sent to the second node to obtain the exclusive access to the sets of data associated with the respective locks in the first block; and
the request is received from a requester at a first node.

12. The system of claim 9, wherein the memory stores instructions executable by the at least one processor to implement:
a granting module to:
grant the request for exclusive access to the first set of data to a first requester on a first node; and
grant a second request for exclusive access to a second set of data associated with a second lock in the first block to a second requester on a second node when the first lock and the second lock are in different portions of the first block;
wherein
the receiving module receives the request to access the first set of data from the first requester on the first node, and
the receiving module receives the second request to access the second set of data from the second requester on the second node.

13. A computer program product comprising:
receiving instructions to receive a request for exclusive access to a first set of data, wherein
the first set of data is associated with a first lock,
a first block comprises a plurality of locks,
the plurality of locks in the first block comprises the first lock, and
each lock of the plurality of locks in the first block is associated with a respective set of data;
block obtaining instructions to obtain exclusive access to the first block, wherein
said obtaining exclusive access to the first block comprises a block agent sending a single message to a block master, and
the single message comprises a request to change an access level for each lock in the first block;
lock obtaining instructions to obtain exclusive access to a plurality of sets of data associated with a respective plurality of locks in the first block, wherein
the lock obtaining instructions are configured to execute subsequent to the block obtaining instructions, and
the lock obtaining instructions are configured to obtain exclusive access to the plurality of sets of data from the block agent; and
a computer-readable medium to store the receiving instructions and the obtaining instructions.

14. The computer program product of claim 13, wherein the exclusive access to the sets of data associated with the respective locks in the first block comprises exclusive access to all of the sets of data associated with the respective locks in the first block if no lock in the first block is in use.

15. The computer program product of claim 13, further comprising:
sending instructions to send one message to request exclusive access to the first set of data to a second node, wherein
only the one message is sent to the second node to obtain the exclusive access to the sets of data associated with the respective locks in the first block,
the receiving instructions receive the request from a requester at a first node, and
the computer-readable medium further stores the sending instructions.

16. The computer program product of claim 13, further comprising:
granting instructions to:
grant the request for exclusive access to the first set of data to the first requester on a first node; and
grant a second request for exclusive access to a second set of data associated with a second lock in the first block to a second requester on a second node when the first lock and the second lock are in different portions of the first block;
wherein
the receiving instructions receive the request to access the first set of data from the first requester on the first node,
the receiving instructions receive the second request to access the second set of data from the second requester on the second node, and
the computer-readable medium further stores the granting instructions.

17. A computer-implemented system comprising:
a processor;
a memory coupled to the processor;
means for receiving a request for exclusive access to a first set of data, wherein
the first set of data is associated with a first lock,
the first set of data is stored in the memory,
a first block comprises a plurality of locks,
the plurality of locks in the first block comprises the first lock, and
each lock of the plurality of locks in the first block is associated with a respective set of data;
means for obtaining exclusive access to the first block, wherein
said obtaining exclusive access to the first block comprises a block agent sending a single message to a block master,
the processor is configured to execute instructions to send the single message, and
the single message comprises a request to change an access level for each lock in the first block; and
means for obtaining exclusive access to a plurality of sets of data associated with a respective plurality of locks in the first block, wherein
exclusive access to the first block is obtained prior to obtaining exclusive access to the plurality of sets of data associated with the respective plurality of locks, and
exclusive access to the plurality of sets of data is obtained from the block agent.

18. The system of claim 17, further comprising:
means for sending one message to request exclusive access to the first set of data to a second node, wherein
only the one message is sent to the second node to obtain the exclusive access to the sets of data associated with the respective locks in the first block; and
the request is received from a requester at a first node.

19. The system of claim 17, further comprising:
means for receiving a second request for exclusive access to a second set of data from a second requester on a second node, wherein
a second lock associated with the second set of data is in the first block, and
the receiving the request for exclusive access to the first set of data comprises receiving the request from a first requester on a first node;
means for granting the request for exclusive access to the first set of data to the first requester;
means for granting the second request to the second set of data to the second requester when
the first lock and the second lock are in different portions of the first block.

* * * * *